United States Patent
Makeev et al.

(10) Patent No.: US 11,601,662 B2
(45) Date of Patent: Mar. 7, 2023

(54) HIERARCHICAL DATA STRUCTURE

(71) Applicant: V-NOVA INTERNATIONAL LIMITED, London (GB)

(72) Inventors: Ivan Makeev, London (GB); Balazs Keszthelyi, London (GB); Stergios Poularakis, London (GB); Michele Sanna, London (GB); Robert Ettinger, London (GB)

(73) Assignee: V-NOVA INTERNATIONAL LIMITED

( * ) Notice: Subject to any disclaimer, the term of this patent is extended or adjusted under 35 U.S.C. 154(b) by 0 days.

(21) Appl. No.: 16/769,794

(22) PCT Filed: Dec. 6, 2018

(86) PCT No.: PCT/GB2018/053551
§ 371 (c)(1),
(2) Date: Jun. 4, 2020

(87) PCT Pub. No.: WO2019/111009
PCT Pub. Date: Jun. 13, 2019

(65) Prior Publication Data
US 2020/0374535 A1    Nov. 26, 2020

(30) Foreign Application Priority Data

Dec. 6, 2017  (EP) .................................... 17386046
Feb. 8, 2018  (EP) .................................... 18386002
(Continued)

(51) Int. Cl.
*H04N 19/119*  (2014.01)
*H04N 19/436*  (2014.01)
(Continued)

(52) U.S. Cl.
CPC ......... *H04N 19/436* (2014.11); *H04N 19/119* (2014.11); *H04N 19/129* (2014.11);
(Continued)

(58) Field of Classification Search
CPC .. H04N 19/436; H04N 19/119; H04N 19/167; H04N 19/176; H04N 19/30; H04N 19/46; H04N 19/96
See application file for complete search history.

(56) References Cited

U.S. PATENT DOCUMENTS

2013/0195202 A1    8/2013  Cheon et al.
2013/0322530 A1*  12/2013  Rossato ................... G06T 9/00
                                                              375/240.12
(Continued)

FOREIGN PATENT DOCUMENTS

EP    1017238          7/2000
EP    1017238 A1  *   7/2000  ............. H04N 19/98

OTHER PUBLICATIONS

International Search Report and Written Opinion for PCT/GB2018/053551 dated Feb. 18, 2019.
(Continued)

*Primary Examiner* — Dave Czekaj
*Assistant Examiner* — Berteau Joisil
(74) *Attorney, Agent, or Firm* — Workman Nydegger

(57) ABSTRACT

A method of decoding a stream of encoded data the method comprising, at a decoder: receiving an encoded dataset comprising multiple tiles; receiving a data structure, said data structure indicative of the amount of data required to encode a plurality of tiles; identifying a portion of the encoded dataset to be decoded by: identifying the tiles associated with the portion to be decoded; determining the location of data related to the tiles based on the amount of data required to encode said tiles; extracting the identified
(Continued)

portion of the encoded dataset from the encoded dataset; and decoding said identified portion of the encoded data set.

20 Claims, 19 Drawing Sheets

(30) Foreign Application Priority Data

Jul. 30, 2018 (GB) .................................... 1812407
Sep. 21, 2018 (GB) .................................... 1815437

(51) Int. Cl.
*H04N 19/167* (2014.01)
*H04N 19/176* (2014.01)
*H04N 19/30* (2014.01)
*H04N 19/46* (2014.01)
*H04N 19/96* (2014.01)
*H04N 19/129* (2014.01)
*H04N 19/44* (2014.01)
*H04N 19/182* (2014.01)
*H04N 19/91* (2014.01)

(52) U.S. Cl.
CPC ......... *H04N 19/167* (2014.11); *H04N 19/176* (2014.11); *H04N 19/182* (2014.11); *H04N 19/30* (2014.11); *H04N 19/44* (2014.11); *H04N 19/46* (2014.11); *H04N 19/91* (2014.11); *H04N 19/96* (2014.11)

(56) References Cited

U.S. PATENT DOCUMENTS

| | | | |
|---|---|---|---|
| 2014/0226721 A1* | 8/2014 | Joshi | H04N 19/176 375/240.12 |
| 2015/0139337 A1* | 5/2015 | Chen | H04N 19/103 375/240.25 |
| 2017/0208335 A1 | 7/2017 | Ramamurthy et al. | |

OTHER PUBLICATIONS

Misra et al., "New Results for Parallel Decoding for Tiles", 97. MPEG Meeting; Jul. 18, 2011 through Jul. 22, 2011; Torino; (Motion Picture Expert Group or ISO/IEC JTC1/SC29/WG11), No. m21028, Jul. 17, 2011, XP030049591.

* cited by examiner

HIERARCHICAL DATA STRUCTURE

The present application is a 371 US National Stage Entry of International Application No. PCT/GB2018/053551, filed Dec. 6, 2018, which claims priority to European Application No. 17386046.1, filed Dec. 6, 2017, European Application No. 18386002.2, filed Feb. 8, 2018, United Kingdom Application No. 1812407.3, filed Jul. 30, 2018, and United Kingdom Application No. 1815437.7, filed Sep. 21, 2018, the disclosures of which are hereby disclosed herein in their entireties.

FIELD OF THE INVENTION

The invention broadly relates to the field of encoding and decoding data, such as image data and video data and content delivery. In particular the invention relates to a method of encoding video data and metadata in an efficient manner which allows for parallelisation of the encoding and decoding process.

BACKGROUND OF THE INVENTION

It is known to encode data, such as image data and video data, for storage or streaming in order to reduce the amount of storage space needed to store the data or the bandwidth required for transmission of the data. By way of example, techniques to encode and decode video data are well known and commonly used, for example the H.264/AVC standard uses a combination of image compression and motion-based estimation techniques to encode video data into an encoded video stream, and then to decode the encoded video stream into a very close approximation of the original video data.

An encoded video stream is typically encoded at a bitrate. The bitrate will vary depending on several factors, one of which is the bandwidth available for streaming the encoded video stream. The lower the bandwidth, the lower the available bitrate of the encoded video stream. Ultimately, the bandwidth defines the quality of the video stream delivered because relatively low bitrates require relatively coarse quantization, i.e. a relatively large quantization parameter (QP). Where a large bandwidth is available, then a finer quantization can be used, i.e. a relatively small quantization parameter (QP). This process is part of a broader rate control mechanism employed when creating encoded video streams.

Video data may be encoded in real time at a bitrate altered in accordance with the amount of available bandwidth between the encoder and a decoder, or encoded and stored in advance of demand and decoding, either as a single bitrate encoded video stream, or in segments representing video data encoded at different bitrates, so that multiple video streams exist and a stream is selected based on the available bandwidth. A decoder may switch between the different bitrate streams dynamically as the bandwidth changes. It is also known to encode video data in a hierarchical manner. In such encoding techniques, residual data (i.e. the data required to correct relatively low quality information present in the base layer) is used in progressively higher levels of quality. All of this results in increasingly complex and sophisticated techniques for encoding and decoding data, such as image or video data.

Metadata can be used to provide a better understanding of the underlying data, especially at a decoder, and as such enable improved rate control techniques and ultimately improved data reproduction quality. However, the improvements to data reproduction quality that arise with the use of metadata must be balanced with the associated processing and time cost of calculating the metadata, storage cost for storing the metadata, and bandwidth cost for transmitting the metadata. There exists a need for improved metadata techniques for data encoders and decoders to alleviate one or more of these problems, especially for image or video encoding and decoding. In particular, there exists a need for new metadata structure which allows for at least one of lower processing cost in generating the metadata, lower storage costs for storing the metadata and lower bandwidth requirements for transmitting the metadata. Also, there exists a need to create a metadata structure which enables more efficient decoding of an encoded data stream.

SUMMARY OF THE INVENTION

Accordingly in order to mitigate some of the above problems there is provided in a first aspect of the invention an encoder and method of encoding a signal, the method comprising: obtaining a dataset to be encoded, said dataset being indicative of one or more properties of the signal; mapping the dataset into a data structure, said data structure defining instances of data, wherein the mapping of the data comprises the steps of subdividing the dataset into a plurality of tiles, each tile defining a block of elements in said dataset; subdividing each tile into a plurality of sub-blocks; defining for each of the plurality of sub-blocks a corresponding node; assigning a value to each node, said value indicating whether the sub-block corresponding to said node contains data above, equal or below a threshold value; and mapping the assigned values into a first level of the data structure.

In accordance with a further aspect of the invention there is provided a decoder and a method of decoding a stream of encoded data the method comprising, at a decoder: receiving an encoded dataset comprising multiple tiles; receiving a data structure, said data structure indicative of the amount of data required to encode a plurality of tiles; identifying a portion of the encoded dataset to be decoded by: identifying the tiles associated with the portion to be decoded; determining the location of data related to the tiles based on the amount of data required to encode said tiles; extracting the identified portion of the encoded dataset from the encoded dataset; and decoding said identified portion of the encoded data set.

In accordance with yet another aspect of the invention there is provided a decoder and a method of decoding a stream of encoded data, the method comprising, at a decoder: receiving an encoded dataset comprising a plurality of tiles; receiving a data structure, said data structure indicative of the distribution of data above, below or equal to, a threshold value for the plurality of tiles; identifying the tiles to be decoded in the data structure which have data above, or equal to, the threshold value decoding the identified tiles.

In accordance with yet another aspect of the invention there is provided a decoder and a method of decoding a stream of encoded data, the method comprising: receiving an encoded dataset comprising a plurality of tiles; receiving a data structure, said data structure indicative of the amount of data required to encode each of the plurality of tiles; identifying a plurality of portions of the encoded dataset to be decoded by: identifying the tiles associated with each portion to be decoded; for each portion determining the location of data related to the tiles for said portion based on the amount of data required to encode said tiles associated with said portion; for each said identified portion, extracting said portion from the encoded dataset; and decoding said a first portion of the encoded data set with a first decoder, and decoding a second portion of the encoded data set with a second, different, decoder.

There is also provided a hierarchical data structure for encoding an image, the data structure including a plurality of levels of quality, each level of quality comprising a plurality of tiers, each tiers comprising one or more data elements. Optionally wherein each level of quality defines a respective set of encoded data which, when decoded, enable a decoder to reconstruct the image up to a desired level of quality; each tier comprises one or more data elements, said data elements being defined depending on the type of tier, and wherein: for a tier of a first type, a first type of data element is defined comprising a subset of the set of encoded data; and for a tier of a second type, a second type of data element is defined comprising one or more attributes associated with the first type of data element.

By defining the data structure required to map the instances of where residual data occurs within a frame of data, it is possible to provide a faster decoding and encoding methodology. In particular the amount of data used to encode the data is sparsified thus reducing the amount of data which needs to be read during decoding. Furthermore, the data, and metadata describing the structure of the data allows for individual portions of the frame to be selectively decoded without reference to other portions of the frame. Thus it is possible to parallelise the decoding process.

Other aspects of the present invention will be apparent from the appended claims.

BRIEF DESCRIPTION OF THE DRAWINGS

Embodiments of the invention will now be described with reference to the accompanying drawings, in which.

DETAILED DESCRIPTION OF THE EMBODIMENT(S)

Embodiments of the present inventions will be now described with reference to the attached Figures. It is to be noted that the following description is merely used for enabling the skilled person to understand the present inventions, without any intention to limit the applicability of the present inventions to other embodiments which could be readily understood and/or envisaged by the reader.

The present invention provides a methodology and apparatus for encoding, and decoding, data, in particular, but not exclusively, image and video data. Specifically, the invention provides a methodology for encoding data which is to be encoded and providing and encoding associated metadata in an efficient manner. Additionally, the invention provides a methodology for decoding the encoded data using their associated metadata in an efficient manner. For ease of reference, in the following description the data which is to be encoded are considered as being residual data, but other suitable data to be encoded could be used, for example RGB values, YUV values, etc.

Figure 1:
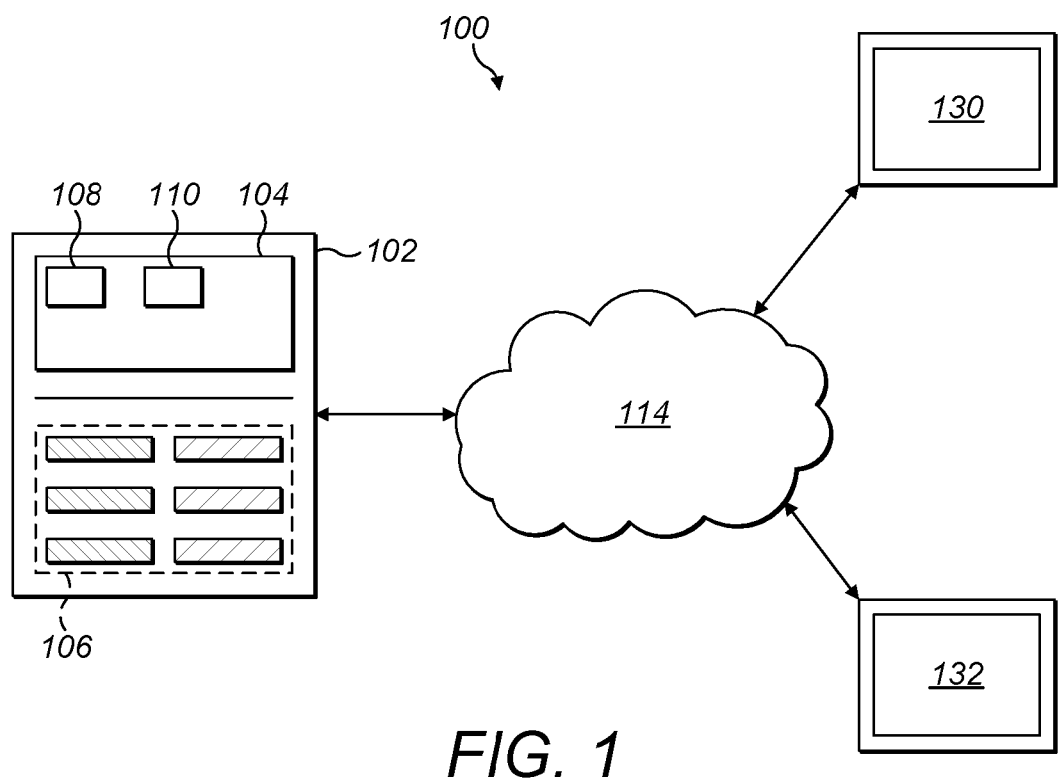
FIG. 1 is a block diagram showing a system for performing an example encoding method.

In FIG. 1 there is shown by way of example a system 100, the system 100 comprising a streaming server 102 connected via a network to a plurality of client devices 130, 132.

The streaming server 102 comprises an encoder 104, the encoder configured to receive and encode a first data signal utilising the methodology described herein. For ease of understanding the following is described with reference to video data as the data signal, although other types of data (such as, for example, images) may be encoded. The streaming server 104 is configured to deliver an encoded data stream, for example a video stream 106 to a plurality of client devices 130 and 132, such as set-top boxes, smart TVs, smartphones, tablet computers, laptop computers etc. Each client device 130 and 132 is configured to decode and render the encoded video stream 106. In further embodiments the encoded data stream, comprises different data such as images/pictures.

For ease of understanding, the system 100 of FIG. 1 is shown with reference to a single streaming server 102 and two recipient client devices 130, 132. In further embodiments not shown but which will be understood by the skilled person in the field, the system 100 may comprise multiple servers and several tens of thousands of client devices.

The streaming server 102 can be any suitable data storage and delivery server which is able to deliver encoded data to the client devices over the network. Streaming servers are known in the art, and use unicast and/or multicast protocols. The streaming server is arranged to encode, and often store, the video data, and provide the encoded video data in one or more encoded data streams 106 to the client devices 130 and 132. Each encoded video stream 106 is generated by the encoder 104. The encoder 104 in FIG. 1 is located on the streaming server 102, although in further embodiments the encoder 104 is located elsewhere in the system 100. The streaming server 102 may provide one or more of live video content or video on demand (VoD) video content. The encoder 104 generates the encoded video stream utilising the techniques described herein. As is known in bitrate control systems, the encoder 104 receives information regarding a target bitrate (i.e. the bitrate for which it is wished for the video to be encoded).

The encoder 104 further comprises a rate controller 108. The rate controller 108 is a software module which determines the bitrate at which the video data is to be encoded. In an embodiment, the rate controller 108 manages the rate control for a single-pass encoder 104, though in further embodiments the encoder 104 is a multi-pass encoder. Part of the functionality of the rate controller 108 is to take a target bit and determine the relevant parameters (such as quantisation parameter (QP)) in order for the encoder 106 to produce an encoded data stream at or near the target bitrate. The functionality of such a rate controller 108 is known in the art.

The rate controller 108 further comprises a rate controller manager 110. The rate controller manager 110 is a software module which determines a target bitrate for the rate controller 108. The functionality of the rate controller manager 110 is described in detail below with reference to FIGS. 3 and 4. The rate controller manager 110 receives an initial target bitrate (i.e. the desired bitrate to be generated by the encoder 104) and determines a modified target bitrate which is used by the rate controller 108 and encoder 106 to encode the data stream at the target bitrate. As is described in further detail below the rate controller manager 110 utilises machine learning principles in order to determine an optimal modified target bitrate for the rate controller 108 and encoder 106. The achieved, or output, bitrate of the encoder 106 typically will be different to that of the target rate due to the parameters used to encode the stream and the codec. Thus, in order to achieve the target bitrate a modified bitrate is determined, said modified bitrate being varied in order to account for the differences between the desired and actual bitrate achieved due to the encoding process.

The client devices 130 and 132 are devices known in the art and comprise the known elements required to receive and decode a video stream, such as a processor, communications port and decoder. The decoder being configured to decode the encoded data stream 106.

An video stream is received at and encoded by the encoder 104 to generate the encoded data stream 106. As described in detail below the parameters used to encode the video stream are determined by the rate controller manager 110 and the rate controller 108.

An aspect of the invention is the creation of a data structure which is used to encode a data signal, and the metadata required to decode the data signal in a low bandwidth and efficient to decode manner. In the following description, for ease of reference we will refer to a specific type of data signal, namely video data, but it is to be understood that this is not a limitation and that the invention is equally applicable to any suitable type of signal, including for example still pictures, images, 3D scans, tomographic pictures, satellite images, radar images, telemetry data, sound signals, etc.

The video data can have any suitable frame size as required. Each frame is subdivided into a plurality of tiles, preferably each of the tiles being of equal size. The tile size may be any size and is defined herein as an N×N tile. In an embodiment, the tile size may be one of 64×64, 32×32, 16×16, 8×8 etc. For ease of understanding the following process is described with reference to a tile of 16×16 elements, however this is purely exemplary.

An aspect of the invention is to define a data structure which enables a data signal, such as video data, to be encoded in a sparsified manner to reduce the bandwidth required to stream the video data at a level of quality, and which allows a decoder to decode the encoded data stream more efficiently (or, in the case of stored video data, to reduce the amount of data storage needed to store and decode). As described in greater detail below, the video data is encoded using a tree structure in a bottom to top manner. For ease of reference, in the following we will refer this tree to a quadtree, but other structure can also be used. Conceptually, the data structure identifies instances of where data to be encoded is present in the video data and maps where that data is present. Areas in which there is no data to be encoded is therefore also identified, in a low-cost manner. As a result, a reduction in the bandwidth required to transmit the encoded data stream and associated metadata information may be achieved. As explained in detail below, the data structure also allows for the data to be encoded in parallel, and separately decoded in parallel. The data structure also allows for more efficient decoding. These advantages will become clearer on reading the following description.

In order to decode the data structure, metadata describing the data structure is required so as to allow the decoder to understand the structure of the encoded data and decode the data.

It is to be noted that the present invention can be used with any type of data to be encoded. In the exemplary case of video signal, the type of data to be encoded can vary depending on the way the video signal is processed. For example, in a hierarchical approach such as the one discussed in further details here or, for example, in U.S. Pat. Nos. 8,977,065, 8,948,248, 8,711,943, 9,129,411, 8,531, 321, 9,510,018, 9,509,990, which are incorporated herein by reference, a video signal is typically divided in individual frames, each comprising a certain number of values (e.g., pixels). The signal may then be processed recursively to reduce it in size (e.g., a full frame of Y×Z pixels (e.g., layer 0) is down-sampled into a first down-sampled frame of Y/2×Z×2 pixels (e.g., layer −1), and then again in a second down-sampled frame of Y/4×Z×4 pixels (e.g., layer −2), and so on and so forth) before then being encoded. What gets encoded is not necessarily an absolute value of the pixel, but for example a value associated with a relative difference between pixel values. For example, a difference may be taken between the value of the pixels at layer −1 and the value of an up-sampled version of the pixels at layer −2 in the same positions. This difference may be sometimes referred to as residuals. The residuals may be further processed using a transformation to generate transformed residuals (e.g., see U.S. Pat. No. 9,509,990 for an example of such transformation), for example to further reducing the entropy and improve the efficiency of the encoding process. In the present description and claims we refer to the term "residuals" or "residual data" to describe either the residuals or the transformed residuals, as the present invention would equally apply to both. Accordingly, in the exemplary hierarchical structure described above, the residuals can be considered as a type of data to be encoded as described in this patent application. In other examples, the pixel values of a frame of a video signal may be directly encoded without taking any difference with respect to a reference frame (and thus generating some form of residuals), or a different type of residuals may be encoded (e.g., temporal residuals such as those in MPEG standard like H.264). In that case, the pixel values or the other types of residuals can be considered as the type of data to be encoded.

The process described herein provides a methodology for mapping a frame of data to be encoded to a sparse hierarchical structure. As discussed above, these data could be residuals, pixel values, etc. By mapping in the below described manner, video data frames can be "sliced" into independent tiles. Each tile can be encoded and decoded separately thus allowing for parallelism. Furthermore, when encoding and decoding data at multiple levels of quality, the below described method allows for each level of quality to be decoded without any knowledge of the preceding level of quality. This is an important advantage and the skilled reader will appreciate that this ability increases the efficiency and flexibility of the decoder.

The following is described, for ease of understanding, with respect to a single frame of data to be encoded taking the form of residual data at a first level of quality. In further embodiments, the frame may contain raw pixel value, luma, chroma, etc. Such a frame can be of any size, and can be subdivided into a number of tiles, each tile being N×N in size. For ease of understanding, the following is described with reference to a tile of 16×16 elements, e.g. 16×16 residuals.

The process described herein results in the encoding of the data, such as residual data, as well as a data structure used to map the occurrences of the data in the encoded data. There is also provided the ability to encode metadata (such as the number of bits required to encode the residual data) and describe the structure metadata in further data structures. Thus, the encoding process results in the encoding of the data, metadata describing the data and data structures to map the data and metadata. There is also described a decoding process in which the data structures are used by the decoder to read the encoded data. As described in detail below by providing the metadata and the data structures to the decoder, it is possible for the decoder to determine the location of data within an encoded data stream and selectively decode the part of the data stream of interest.

Figures 2, 3:
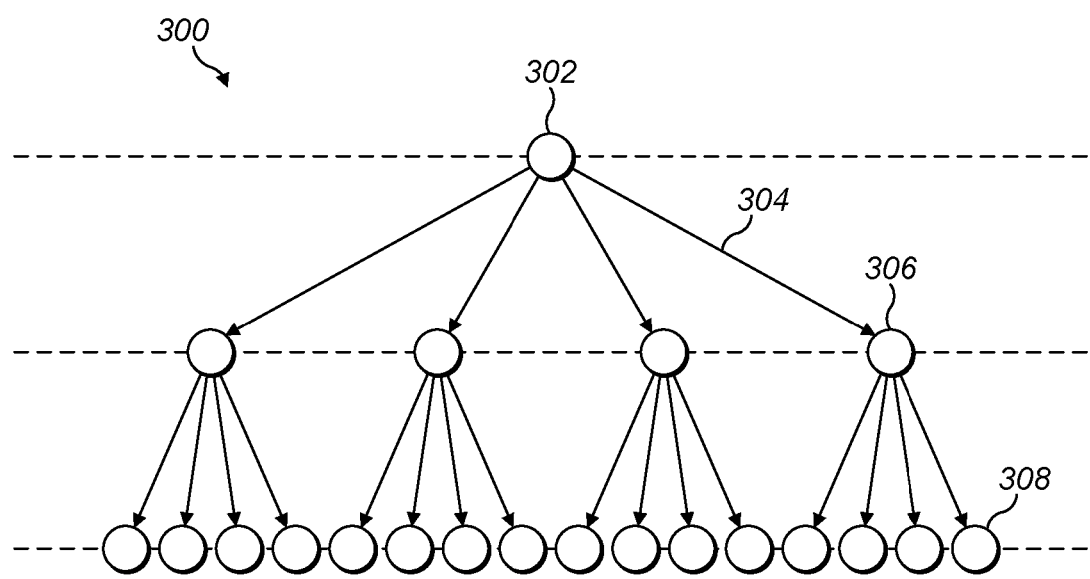
FIG. 2 is a representative example of a tile of N×N pixels of residual data.
FIG. 3 is an example dense quadtree.

FIG. 2 is an example a tile of residual data, said tile being N×N in size. For ease of understanding the following is described with reference to a 16×16 tile of residual data. As mentioned before the principle applies to other N×N sized tiles.

As can be seen in FIG. 2, the elements of the tile have various values of residual data. In further embodiments, the elements of the tile may be other data and/or metadata relating to properties of the video data, for example, luma, chroma, noise, bit size etc.

As shown in FIG. 2, a number of elements have a zero value and the remaining elements have a non-zero value. The values shown in FIG. 2 are shown by way of example only and the values may be any suitable value.

The presence of residual data is typically indicative of the presence of a feature, or an edge in image data (as such features are known to include frequencies too high to be captured in a lower level of quality). As explained in further detail below the following process allows for residual data to be encoded for all corresponding pixels in an efficient manner. In particular, the data structure identifies areas, or regions, within the tile which have residual data (e.g. where edges are present).

As is known when encoding residual data, some groups of nearby elements will have all zero values (indicating that there is no reason residual data associated with the elements) and some elements will have a non-zero value. Accordingly, not every element within the tile will be non-zero. An aspect of the described process is that a high proportion of elements need not be encoded (and therefore decoded), for example where the elements have zero value, or have a value at or below a threshold value. The described process identifies blocks of residual data on the tile and only encodes (and therefore decodes) the necessary blocks, thereby sparsifying the data. This sparsity is represented in FIG. 2 by elements within the tile taking a value of "0". A further aspect of the described process is that in addition to sparsifying the residual data there is provided metadata in the form of a sparsified tree structure which then allows the residual data to be decoded, and in particular, decoded efficiently.

Accordingly, this sparsity can be utilised to increase the speed of encoding and decoding by only encoding and decoding the non-zero values. In contrast, a dense approach would encode and decode every value within a tile regardless of whether or not it is zero. Such an approach can be inefficient when large amounts of the data is zero. Furthermore, as explained in detail below, the process allows for individual portions, or elements, of the frame to be decoded separately, without reference to other elements. Thus, it possible to decode the data encoded in the manner described utilising multiple separate decoders thereby allowing for parallelisation of the decoding process.

An aspect of the invention is therefore the efficient means by which the non-zero elements of a tile can be identified, and used.

In an embodiment, a sparse quadtree data structure is used to identify the elements of the tile containing non-zero values during encoding and decoding.

FIG. 3 shows a representative example of a dense quadtree 300. A quadtree is composed of nodes (e.g. 302, 306) and edges (e.g. 304) that connect nodes, such as a parent node 302 to a child node 306. In the quadtree of FIG. 3 each parent node has exactly four child nodes. A quadtree can contain a number of leaf nodes 308. A leaf node is defined as a node containing no children. A quadtree can further contain a root node 302 which is defined as a node without a parent. A root node 302 is referred to as being the lowest level node 302 of the tree 300. Leaf nodes 308 are referred to as being the highest-level nodes of the tree. Nodes that contain both parents and children (e.g. 306) are referred to as inner nodes.

Figure 4:
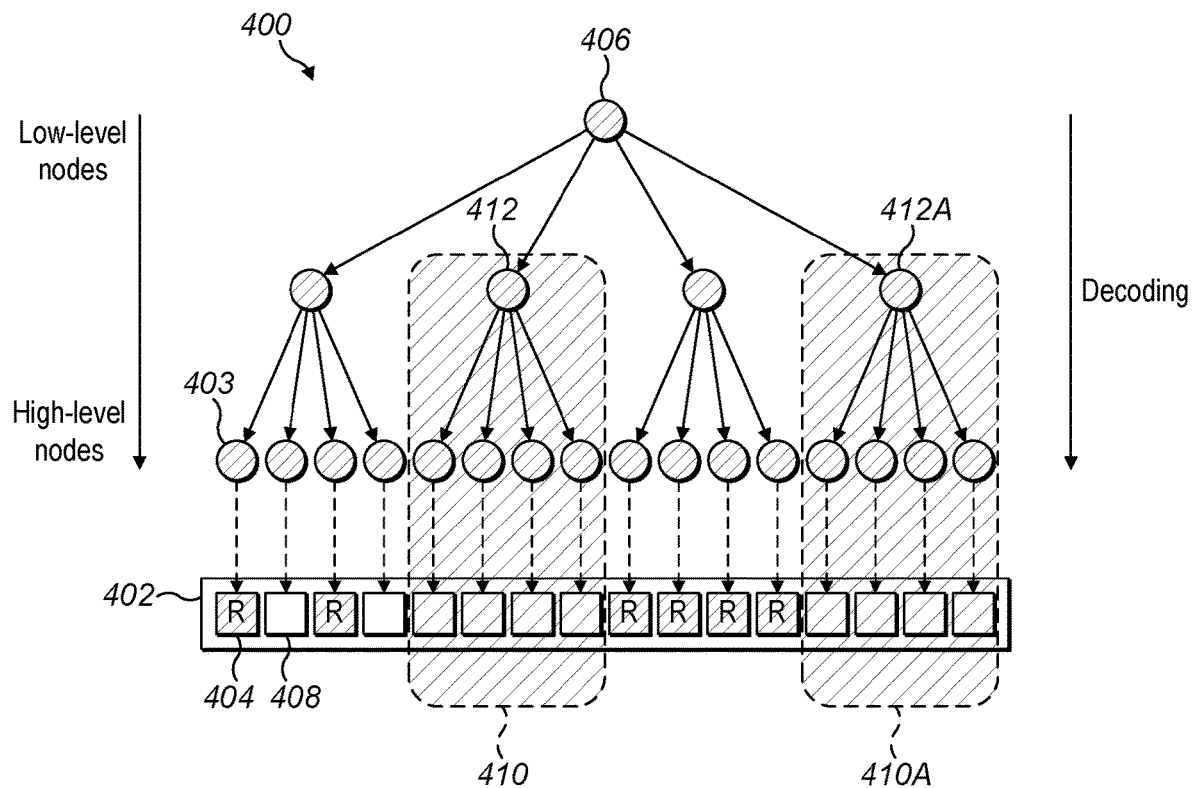
FIG. 4 shows a dense quadtree and sparse quadtree representation of a row of residual data according to an aspect of the invention.
Figure 4:
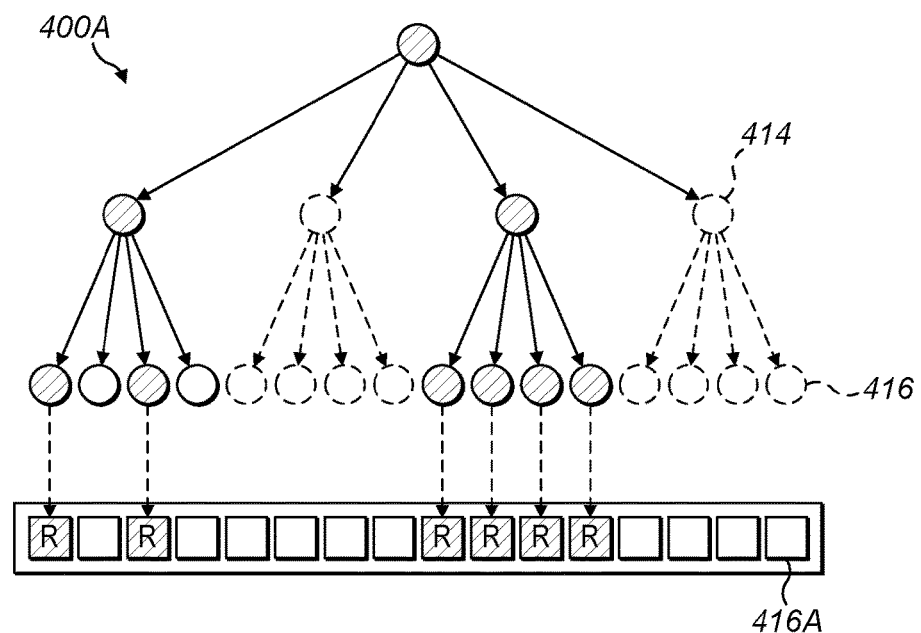

In FIG. 4 there is shown a quadtree 400 that is used to map a row of residual data 402. Said quadtree 400 is composed of leaf nodes 403, inner nodes 412, and a root node 406. Each leaf node 403 of the quadtree 400 corresponds to the location of a specific item of residual data on the row 402.

As an example, leaf node 403 maps to an item of residual data 404. By traversing the quadtree from the root node 406 in a set traversal order (e.g. depth first), each element on the row 402 can be read in the same order during encoding and decoding. As mentioned above, reading every item of residual data on the row in the above manner can be inefficient. This inefficiency is particularly evident when only some of the residuals are non-zero.

An aspect of the invention is to identify regions of a tile that are empty (i.e. the residual values of every element within that region are zero) at the lowest possible level on the tree to improve the efficiency of the encoding and decoding process. Returning to FIG. 4, the regions 410 and 410A on the row 402 contain only residuals with value zero. In this case, when decoding row 402, the traversal could break at node 412 and again at 412A as all of their children map to zero residuals.

Accordingly, a sparse quadtree 400A is used. A sparse quadtree is defined in the same ways as a dense quadtree but with empty nodes. In the sparse quadtree, each parent node has either exactly four child nodes, or no children. This is in contrast to the quadtree in FIG. 3 where each parent node has exactly four children. An inner node is considered empty if all of its children are likewise empty. A leaf node is considered empty if its corresponding residual value is zero, or the corresponding residual value is below a certain threshold value.

As an example, inner node 414 is empty because its leaf nodes all map to residual values of zero, e.g. 416, 416A. During traversal of a sparse quadtree, children of a node are only visited if said node is not empty. Accordingly, if an empty node is visited during traversal, then the traversal does not continue to said empty node's children as they will all, by definition, be likewise empty.

During decoding, the tree 400A is traversed in a bottom to top definition; that is, the tree 400A is traversed from the lowest level to the highest level. In an embodiment, the tree is traversed in a depth-first manner. Doing so is equivalent to visiting the elements of the N×N tile in a z-order traversal. This allows for spatial information to be utilised as part of the encoding and decoding process. It further ensures that the elements are decoded in the same order that they are encoded. In further embodiments, other traversal methods could be employed to utilise further aspects of the structure of the tile.

Thus, the sparse quadtree data structure defines the instances and location of residual data.

Figure 5:
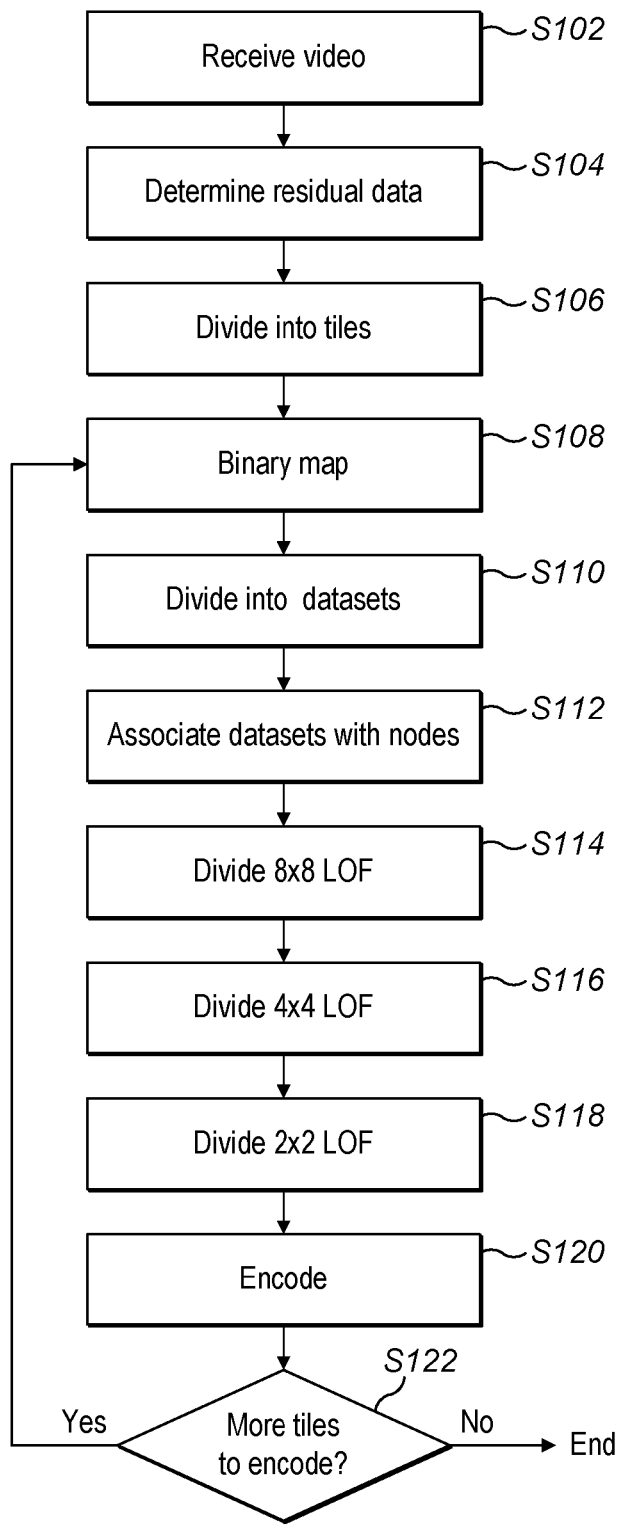
FIG. 5 is a flow chart of the methodology of encoding a video stream according to an aspect of the invention.

FIG. 5 is a flow chart of the process of constructing a sparse quadtree according to an aspect of the invention. The sparse quadtree may then be encoded as part of the encoded data stream.

The process described with reference to FIG. 5 is that used to map of the instances of residual data in a sparsified manner. This mapping process determines a first tier, Tier-0, of a data structure used to encode the data.

For ease of reference the following is described with reference to a tile of data, for example residual values, said tile is 16×16 pixels in size. In further embodiments, the following process can be used for tiles of different sizes, for example 8×8, 32×32, 64×64, etc.

The process described herein provides a methodology for mapping a tile of data (residual data, metadata or any other form of data) from a first frame of video data, in a hierarchical tree structure, as a sparsified quadtree. As described in detail below, by mapping in the below described manner the amount of data to be encoded (and consequently subsequently decoded) is reduced. Furthermore, when the process is used to encode the data stream at multiple levels of quality, in a hierarchical manner, the described data structure removes any requirement of the preceding or proceeding level of quality. Thus, a level of quality may be encoded, and decoded separately and without reference to any other layer. Thus, in contrast to many known hierarchical encoding schemes, where there is a requirement to decode the lowest level of quality in order to decode any higher levels of quality, the described methodology does not require the decoding of any other layer of quality.

An aspect is that the hierarchical tree structure defines instances of when data is present (and therefore needs to be encoded) and provides a mapping to identify where (positionally in the tile) such data is present. As explained below, as the encoding is done in a bottom-to-top manner, areas of the frame where no data is present are identified in a manner that reduces the amount of data to be encoded, thus sparsifying the data.

The following is described, for ease of understanding, with respect to a single frame of video data encoded at a first level of quality.

At step S102 a first frame of video data to be encoded is received. The video data may be stored locally, or received from an external source such as a server.

The first frame of video has associated with it, metadata, or data, describing a first property of the frame.

The step of determining the residual data associated with the first frame of video data may be performed by using any known, suitable, method in the art. The present invention defines a methodology for encoding the residual data and any further metadata for a frame in an effective manner. As the data can relate to residual data, the process described herein can be used to encode enhancements for the frame of video data.

At step S104 residual data is determined. The step of determining the residual data can occur using any known process, for example the process of subtracting a reference signal from a reconstructed signal such as described in patent publication number WO2013011494, the contents of which are incorporated by reference.

At step S104 therefore, in an embodiment, for each pixel the residual data for the first frame of video is determined, thereby defining a residual frame.

In further embodiments, the residual frame has been previously determined, and stored in a memory. In such embodiments, the residual frame is sent to the encoder at step S104 and encoded as part of the encoded data stream.

The following steps of the method define a novel methodology for defining and storing metadata which maps the distribution of the residual data.

At step S106 the residual frame is subdivided into a plurality of tiles. The tiles in a preferred embodiment are regularly sized across the frame, and define a 16×16 pixel tile.

An example of a tile of residual data is shown in FIG. 2.

As described with reference to FIG. 2, an aspect of the invention is to define a data structure, which defines instances and locations of metadata for the frame of video data.

In order to define where instances of residual data occur on a tile, at step S108 a 16×16 tile of residuals is converted, by performing a binary mapping operation, to binary values. Each element is assigned a binary value depending on the value of the element. If an element has a non-zero residual value the equivalent element in the binary map is assigned a value of "1", otherwise it is assigned a value of "0". In further embodiments, a non-zero threshold value is used. For example, if it is determined that a certain non-zero residual value may be considered as acceptable then such a value may be used as a threshold, and therefore if the element is above the non-zero threshold value it is assigned a value of "1", if it is below the non-zero threshold value it is assigned a value of "0" (a value equal to the non-zero threshold value may be assigned a "0" or a "1" depending on how the process is implemented). Note that "0" and "1" are simply equivalent logical binary numbers to identify two alternatives—in other words, they can be either actual number (zero and one) or two equivalent logical values.

The binary map produced at step S108 is, by definition, the same size of the tile of residual data (e.g. 16×16) and defines the location of the elements which contain residual data within the tile of residual data. As the data is defined in a sparsified manner it defines a 16×16 level of sparsification (LOS) which maps the residual data. In an embodiment, the 16×16 LOS is not encoded as part of the encoded data stream as such data is redundant in the encoded data stream in view of the residual data held in Tier-0. However, such data is used to define further levels of sparsification.

The following process is used to identify the largest possible areas within the tile which do not contain any residual information. If it is possible to identify a portion of the tile (e.g. an 8×8 element) as containing no residual information then the data requirement to describe such a portion is reduced to zero. Accordingly, steps S112 to S118, may be considered as defining areas of the tile which do not contain residual data.

Figure 6:
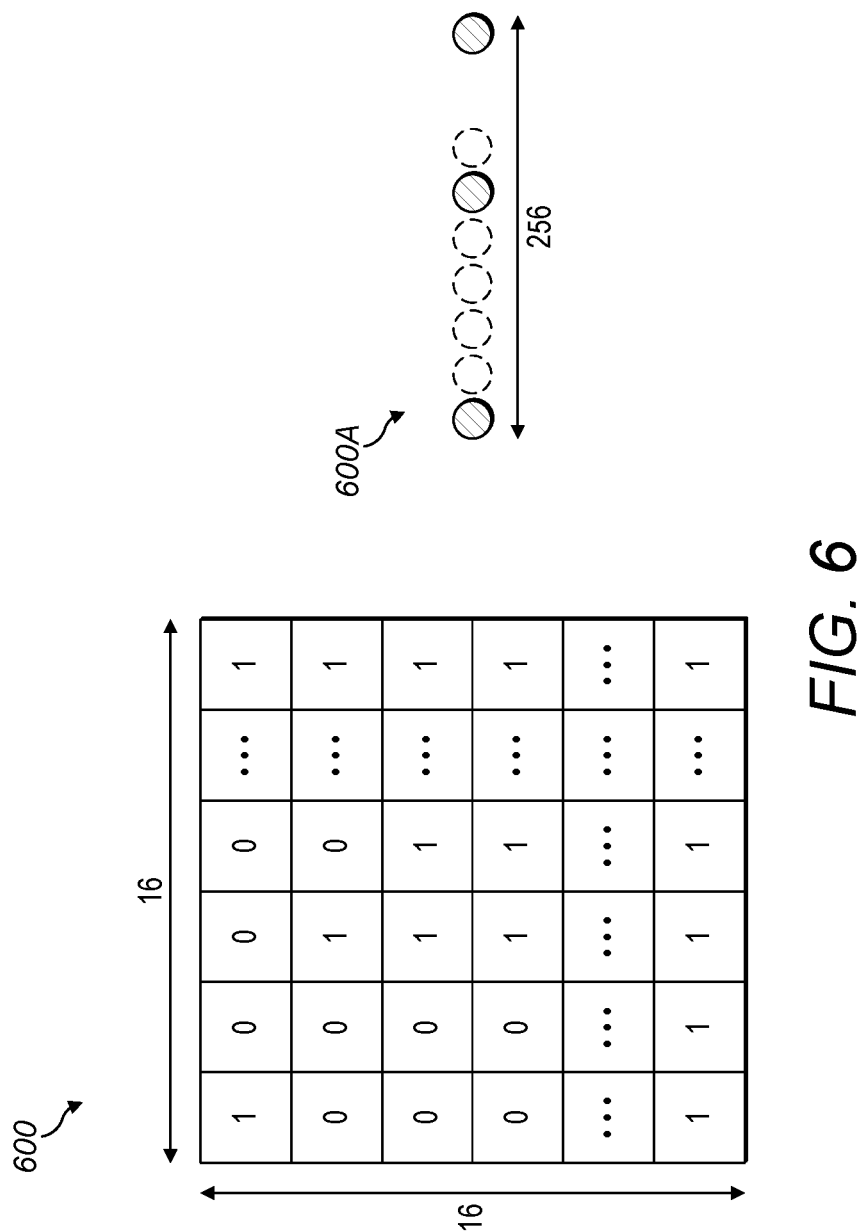
FIG. 6 is a representative example of a 16×16 level of sparsification according to an aspect of the invention.

An example of the 16×16 LOS of FIG. 2 is shown in FIG. 6. As can be seen in FIG. 6 any non-zero value in FIG. 2 is converted to a value of 1 and therefore maps the residual data.

Therefore, the 16×16 LOS maps, on a pixel-by-pixel basis where residual data is present.

Thus, it defines the highest level nodes of the quadtree data structure 600A.

At step S110 the 16×16 LOS is subdivided into a plurality of datasets. Each dataset is preferably a quad of 2×2 pixels. Thus, the 16×16 LOS is subdivided into an 8×8 arrangement of non-overlapping 2×2 quad datasets. This 8×8 structure defines an 8×8 LOS.

Thus, it defines the next level down in the quadtree data structure.

Furthermore, at step S110 the datasets are grouped into nodes. Each node comprises a 2×2 grouping of datasets.

Figure 7:
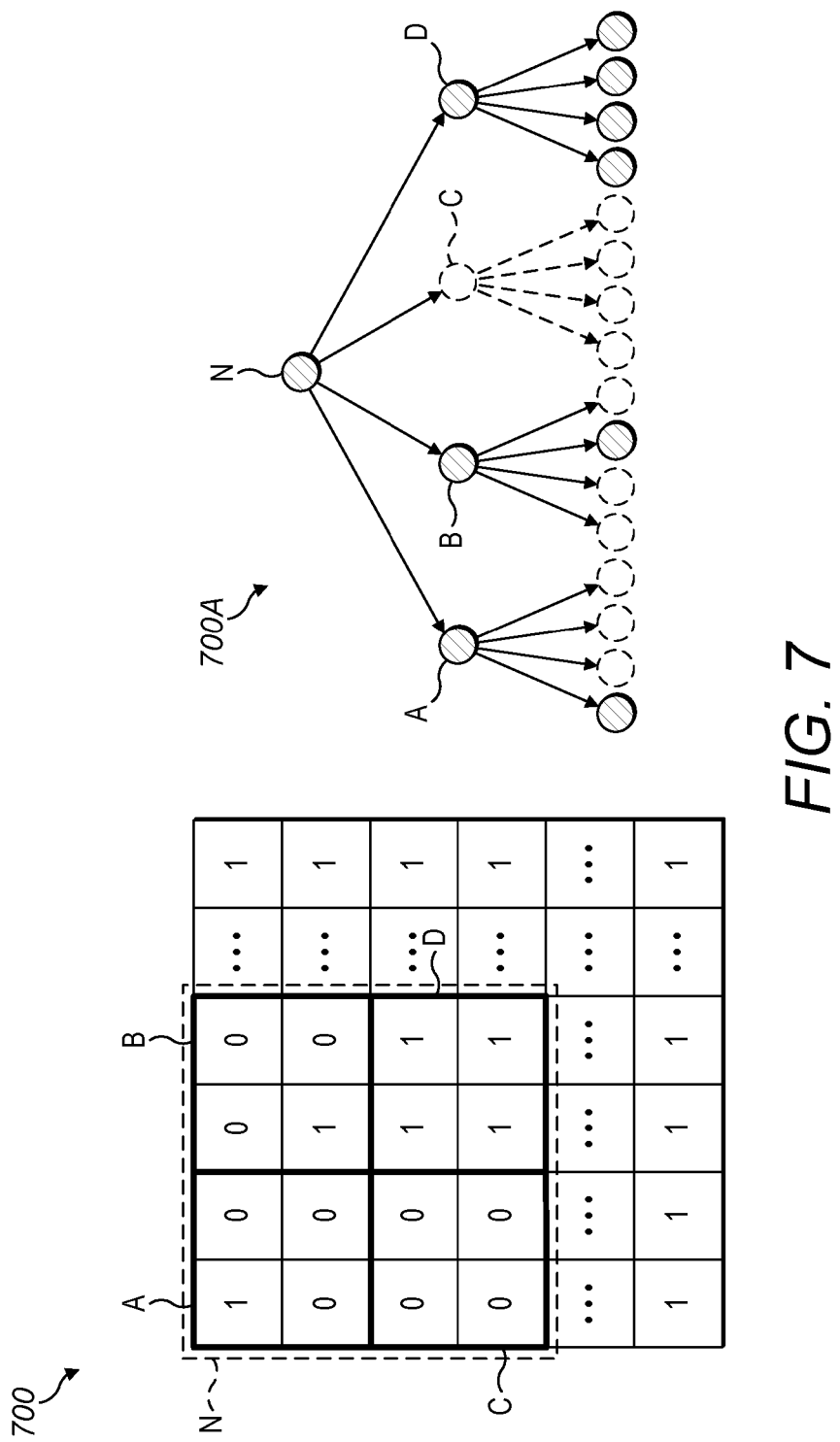
FIG. 7 is an example showing the relationship between a 16×16 level of sparsification and 2×2 quad datasets.

FIG. 7 is a representation of the 8×8 LOS 600 of the 16×16 LOS of FIG. 6 where the pixels have been grouped into datasets, each dataset being a quad of 2×2 pixels. Four datasets A, B, C, D are shown in FIG. 7. For ease of understanding not all of the datasets are shown in FIG. 7.

Each dataset is associated with a node of 2×2 datasets. In the example shown in FIG. 7, datasets A, B, C and D defines a node as a 2×2 quad. This is identified as node N.

At step S112 each dataset is associated with a node. In the preferred embodiment, a node is defined a 2×2 quad of datasets.

An example of the node N is shown in FIG. 7 as the dashed box which encompasses datasets A, B, C, D.

At step S114 each dataset is assigned a single value, said single value being indicative if the pixels which define each dataset contains any residual information above a threshold, or a non-zero value. If step S108 is performed and a binary mapping occurs the threshold value is any value above "0". In further embodiments, the threshold value may be any value.

Figure 8:
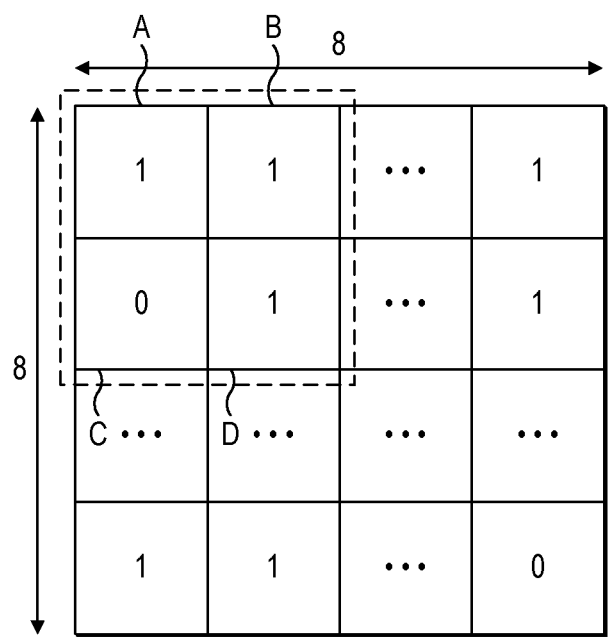
FIG. 8 is a representative example of an 8×8 level of sparsification according to an aspect of the invention.

FIG. 8 is a representation of the step of applying the threshold value to the metadata. In FIG. 8 datasets A, B and D all have at least one element with a non-zero value, therefore each of A, B and D have a value of "1". Dataset C entirely comprises 0 values and therefore dataset C is assigned a value of "0". Thus FIG. 8 defines for the tile an 8×8 LOS with the data defining whether any further residual information is present. In FIG. 8, the node N of A, B, C, D is also shown. In an alternative embodiment, it may be decided that if a dataset comprises a number of non-zero values above a specific threshold, then a value of "1" is assigned to that dataset, whilst if the dataset comprises a number of non-zero values below the specific threshold, then a value of "0" is assigned to that dataset (if the dataset has a number of non-zero values equal to the threshold, a value of "0" or "1" may be assigned depending on how the process is implemented). For example, if the threshold is 2 and a value of 1 would be assigned if a dataset has a number of non-zero values above 2, then dataset A, B and C in FIG. 7 would be assigned a value of "0" and the dataset D in FIG. 7 would be assigned a value of "1".

Part of the invention is to define the structure of the metadata, via the tree structure, using the minimum amount of information. An aspect of the invention is that if it is determined that all of the quad datasets (e.g. A, B, C, D) which define the node N do not contain any residual data, then all pixels which form the node can be identified as containing no residual data. As such the node is finalised and no further high-level definition of the tree structure is required. However, it may be possible to identify if the node is part of a larger structure which does not contain any residual information. Conversely if any of the quad datasets which form a node contain residual data then further high-level data is required to define where the residual data occurs.

At step S116 a 4×4 LOS is determined for the structure. As with the creation of the 8×8 LOS, which is created by grouping data from the higher level (i.e. the 16×16 LOS), the 4×4 LOS is created by grouping the 8×8 LOS into datasets defining 2×2 quads, or child node, and each quad is assigned a binary value based on the values of the 8×8 LOS elements which form the quad. In the example shown in FIG. 8, data structures A, B, C and D define a 2×2 quad in the 4×4 LOS.

The 4×4 LOS is determined in the same manner as the 8×8 LOS. Each 2×2 quad, or descendant node, of data structures is assigned a binary value based on whether any of the elements contains a non-zero value. In the example shown in FIG. 8 as elements A, B and D have a non-zero value the entire quad is assigned a non-zero value. This process is repeated for all other quads, or descendant nodes (not shown) which define the 4×4 LOS. Similarly as for the 8×8 LOS, in an alternative embodiment, it may be decided that if a 2×2 quad comprises a number of non-zero values above a specific threshold, then a value of "1" is assigned to that dataset, whilst if the 2×2 quad comprises a number of non-zero values below the specific threshold, then a value of "0" is assigned to that 2×2 quad (if the 2×2 quad has a number of non-zero values equal to the threshold, a value of "0" or "1" may be assigned depending on how the process is implemented). For example, if the threshold is 1 and a value of 1 would be assigned if a 2×2 quad has a number of non-zero values above 1, then the 2×2 quad formed of elements A, B, C and D in FIG. 8 would be assigned a value of "1", and so on for the other 2×2 quads.

At step S118 a 2×2 LOS is also defined based on the 4×4 LOS values, which occurs in the same manner.

As can be seen from the above process if one of the elements of the 2×2 LOS is identified as having no residual data, then during encoding it possible to essentially ignore, or bypass, one quarter of the frame as there is no data to be encoded.

Figure 9:
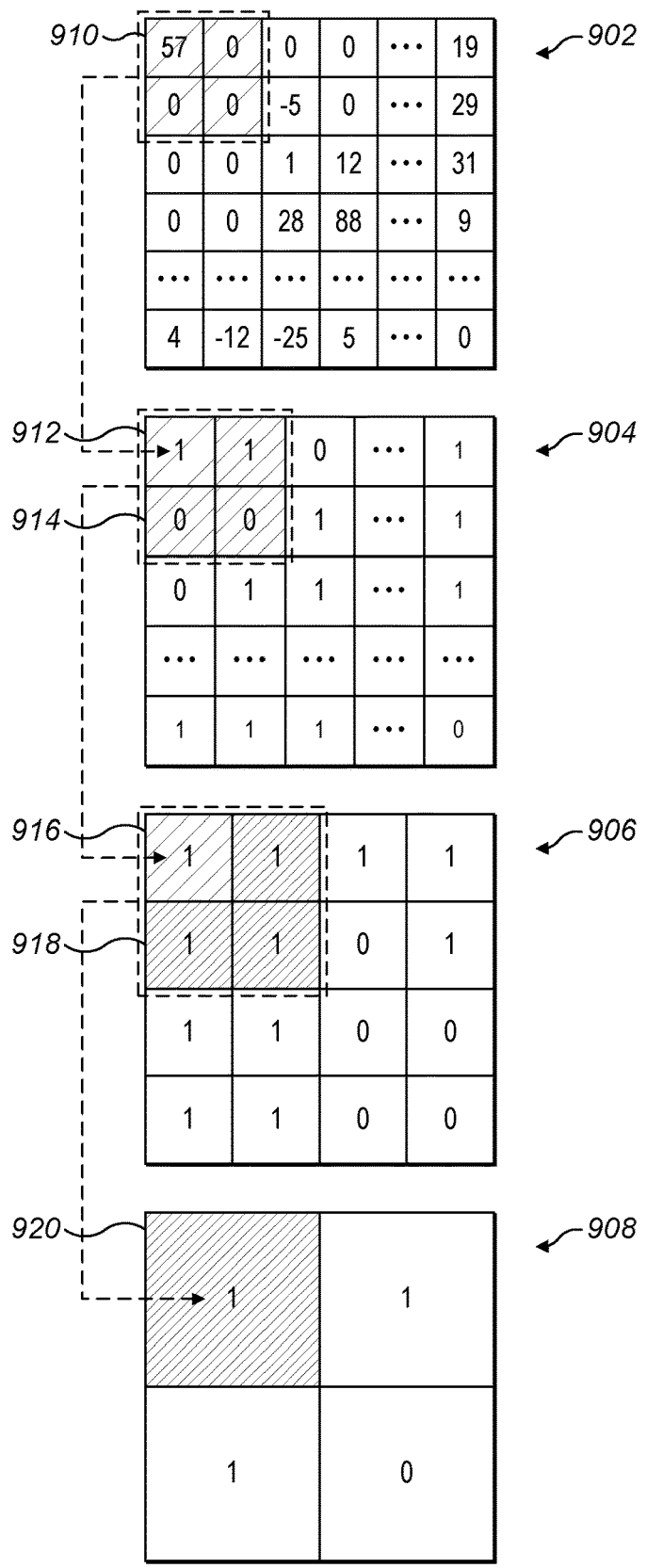
FIG. 9 is an example of the different levels of sparsification data according to an aspect of the invention.

FIG. 9 is a schematic representation of the overall structure. The data is described in such a manner that the residual data is defined (in a 16×16 tile) 902 followed by the 8×8 LOS 904, 4×4 LOS 906 and the 2×2 LOS 908.

Each 2×2 quad at each of the levels 902, 904, and 906, is used to define an element in the proceeding level in a hierarchical manner. For example, the 2×2 quad 910 at level 902 is used to define the value of element 912 at level 904. Within the 2×2 quad 910, there is at least one non-zero value and as such a value of 1 is recorded at 912. The values within the 2×2 quad 914 at the 8×8 LOS 904 are then used to define the value 916. Subsequently, the values within the 2×2 quad 918 at the 4×4 LOS 906 are used to define the value 920 at the 2×2 LOS 908.

As detailed above, as the residual data is defined, the 16×16 LOS is redundant as the information is already present in the residual data. However, as seen above the 16×16 LOS may be used in the process of determining the 8×8 LOS.

Returning to FIG. 5 at step S120 the data relating to the tile and the sparse quadtree structure is encoded. The data is encoded as a sequence of values, said sequence of values defining the 2×2 LOS, 4×4 LOS, 8×8 LOS, and residual data. Said sequence of values is referred to as a stream, a bitstream, or a bytestream.

The sparse quadtree topology is therefore encoded into the data stream. In an embodiment for each quad of nodes (i.e. the 2×2 node structure) a node value may be assigned to indicate whether the node has data or not. This value is called a T-node value If the node has no data then there is no need to send any further data relating to the empty nodes to define the sparse quadtree structure as such information is redundant.

For example if a 16×16 tile contained one quad having no sparsified elements the stream of the Tile (comprising the topology of the sparse quadtree and the residual data) may be encoded as follows:
0100 (T-Node for 2×2 LOS)
1000 (T-Node, 4×4 LOS)
0100 (T-Node, 8×8 LOS)
Res1
Res2
Res3
Res4

The T-Node for the 2×2 LOS defines that only a single quad has residual data. As three of the four quads have no data below the 2×2 LOS there is no need to define any further data for the quadtree topology. Therefore there is only a single T-Node for the 4×4 LOS and 8×8 LOS as all other values are empty. Finally the residual data values (Res1, Res2, Res3 and Res4) are defined. Thus the structure is provided in a sparsified manner to remove any redundancies in the data.

By way of a further example if two neighbouring quads were non-sparsified the data stream might have the form:
0100 (T-Node)
1000 (T-Node)
0110 (T-Node)
Res1
Res2
Res3
Res4
Res5
Res6
Res7
Res8
where in the same manner described above, it can be seen that the redundant data is not encoded.

In an embodiment, where all the values of the T-Node contain data, the data for the T-Nodes can be replaced a single bit of metadata to indicate that all the T-Nodes for a Tessera have a value of 1111. In such cases the tree need not encoded or decoded as the value for all nodes is constant.

At step S122 a check is made to test whether all tiles produced at step S106 have been encoded. If there are still tiles left to encode, then the process moves to step S108 and the above described process is repeated for the next tile. If there are no tiles left to encode, then the process terminates.

As such the process defines, in a sparsified manner, a data structure which defines instances of residual data.

A data structure as described above is said to belong to Tier-0. For a frame of video data, Tier-0 corresponds to the set of all data structures created using the above described process to define instances of residual data.

An aspect of the invention is that the tile and quadtree structure described above is a specific example of a generic abstract data type referred to herein as a Tessera.

A Tessera is defined as an abstract data type used to represent a fixed size encoding unit. The encoding unit can be of any size N×N, such as 2×2, 4×4, 8×8, 16×16, 32×32, etc. A Tessera is used to represent the values and structure of a fixed size block of data.

A Tessera comprises a fixed size block of data and further comprises a structure used to map the locations of the data on said block of data. As described above, in an embodiment a Tessera comprises a sparse quadtree to map the locations of the data. In further embodiments, other structures may be used such as octrees.

In an embodiment, a Tessera may further comprise further information, such as header information, relating to further aspects of a Tessera required for encoding and decoding.

A Tessera used to represent residual data, as described above, is referred to as a Tessera of residual data. Accordingly, an individual Tessera takes on a parametric type. The parametric type defines what is stored on the fixed size block of a Tessera. In an embodiment, this parametric type is residual information. In further embodiments, other parametric types may be used such as metadata, luma, chroma, etc.

In an embodiment, a Tessera may further comprise a mapping function that is applied to the values held on a Tessera during encoding and decoding.

In an embodiment, when a Tessera is encoded, a mapping function may be used to calculate the value to be encoded. At a specific location i on an N×N block, where i is in the range [0, $N^2$), the value of the element at said position is represented as $u_i$ and the value to be encoded is represented as $v_i$. The mapping function, $f(\ )$, can be used to calculate the value to be encoded from the value of the element such that $$v_i = f(u_i) \qquad (2)$$

In an embodiment, the mapping function is set to identity such that $$v_i = f(u_i) \qquad (3)$$
$$= u_i$$

In a further embodiment, the mapping function is set to be the prefix difference function such that $$v_i = f(u_i) \qquad (4)$$
$$= (u_i - u_{i-1})$$

where $u_0 = 0$.

Thus, as explained below, by selecting different mapping functions different data can be encoded and subsequently decoded. The choice of data to be encoded provides further flexibility to the system which utilises the herein described methods.

Figure 10:
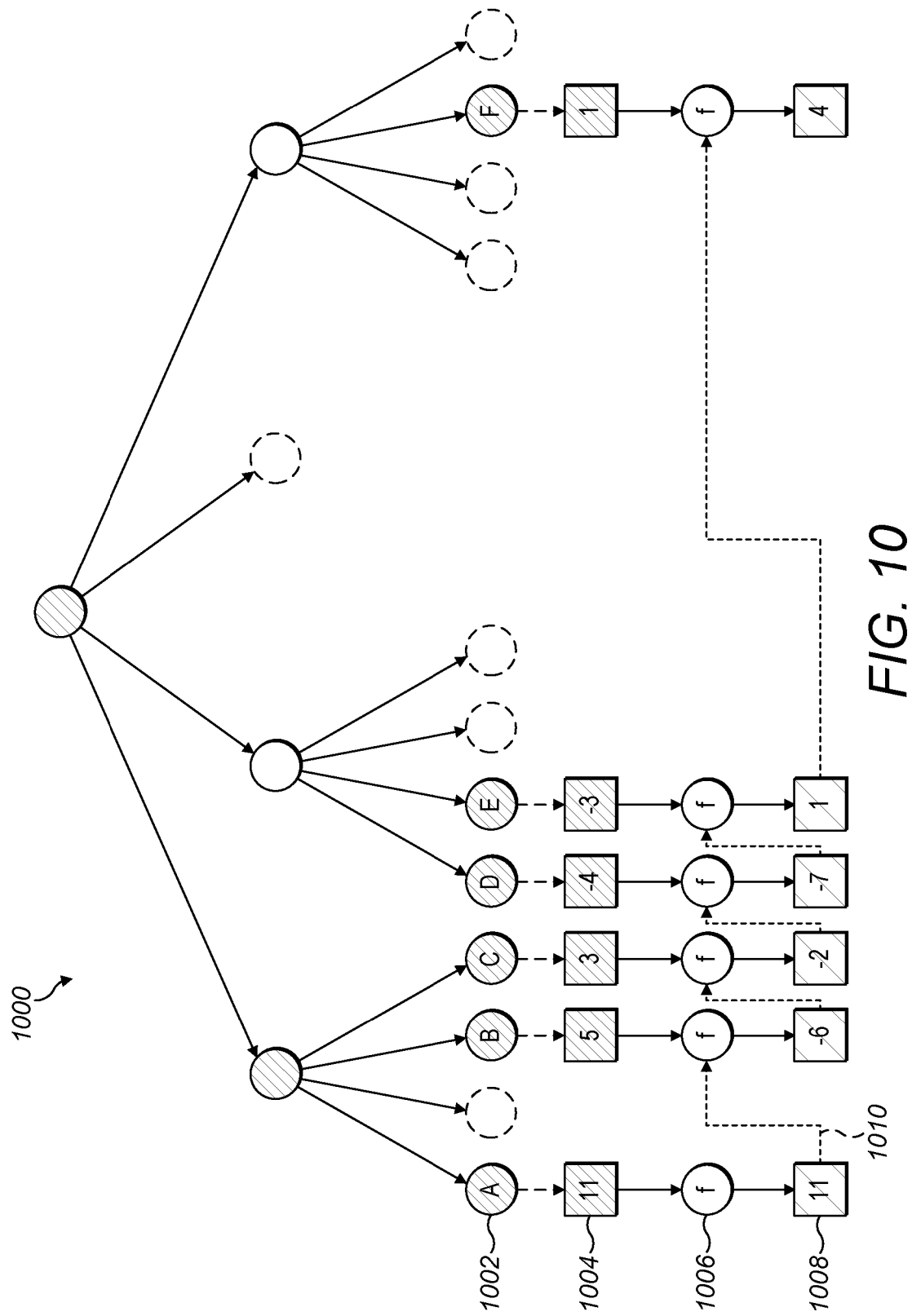
FIG. 10 is an example of the use of a mapping function during traversal of a tree for the purpose of encoding according to an aspect of the invention.

FIG. 10 shows a representative example of the use of a mapping function. In the example shown in FIG. 10 the function is a prefix difference function as described above. In further embodiments, other mapping functions are used.

In FIG. 10 there is shown a quadtree 1000 with leaf nodes 1002 that map to residual values 1004. A mapping function 1006 is used to determine from the residual value 1004 the value to be encoded 1008. The value to be encoded 1008 can be used as input into the next mapping function 1010.

The quadtree 1000 is traversed such that its leaf nodes are visited in a set order, namely A, B, C, D, E, and F. When a node 1002 is visited, a function 1006 is applied to its value 1004 to produce a value to be encoded 1008. In an embodiment, the function is as defined in Equation 3 which maps the value to be encoded to be equal to the node's value, i.e. an identity function.

As the quadtree topology is encoded into the data stream in the manner described above with reference to FIG. 5 and step S120 the data is encoded using T-Nodes to avoid the encoding of redundant data.

In an embodiment, when using the prefix difference function defined in Equation 4, the previously encoded value can feed into the next function call 1010. The prefix difference function allows for blocks of data with large residual values to be encoded in an efficient manner. If said block of data contains residual values that are large but with little variation between values, then the prefix difference will encode the difference between these values.

The above described method is described with reference to the encoding of data, and the same principles are used to decode the data. In an embodiment, a Tessera may be decoded in the same manner with the inverse of the encoding mapping function being used to compute the value to be decoded at a specific position.

In an embodiment, when the prefix difference function as described in Equation 4 is used for encoding, the prefix sum function can be used for decoding. The prefix sum function is defined as $$v_i = f(u_i) \qquad (5)$$
$$= \sum_{j=0}^{i} u_j$$

where $u_i$ is the value to be decoded, $v_i$ is the decoded value, and $u_0 = 0$.

An example is given of how the prefix difference function of Equation (4) and the prefix sum function of Equation (5) can be used for encoding and decoding a stream of data. A data stream is given: $x=[10, 14, 8, 10, 1]$. The prefix difference function, $f$, of Equation (4) is applied to x on an element-by-element basis to produce the stream to be encoded:

[(10−0)]
[10, (14−10)]
[10, 4, (8−14)]
[10, 4, −6, (10−8)]
[10, 4, −6, 2, (1−10)]
$f(x)=[10, 4, −6, 2, −9]$

To decode the above stream, the prefix sum function, $f'$, of Equation (5) is applied such that:

[(0+10)]
[10, (0+10+4)]
[10, 14, (0+10+4−6)]
[10, 14, 8, (0+10+4−6+2)]
[10, 14, 8, 10, (0+10+4−6+2−9)]
$f'(f(x))=[10, 14, 8, 10, 1]$

Accordingly, the prefix sum function recovers the original input stream x.

Whilst the process described above, with reference to FIG. 5, allows for the data to be described in an efficient manner, for tiles N×N in size, in practice frames of video data may be larger than N×N. Accordingly, an aspect of the invention is that multiple Tesserae can be combined to define larger size elements in a grid.

For example, multiple 16×16 element Tesserae can be arranged into a 16×16 grid to represent an area of 256×256 elements. By collating each 16×16 Tessera into a 16×16 grid, it is possible to define a 256×256 frame. Furthermore, as in practice frames are typically larger than 256×256, it is possible to stack the 256×256 frames into a further 16×16 grid. This process of defining larger structures of 16×16 elements may be repeated as many times as required to define the frame of the desired size.

Figure 11:
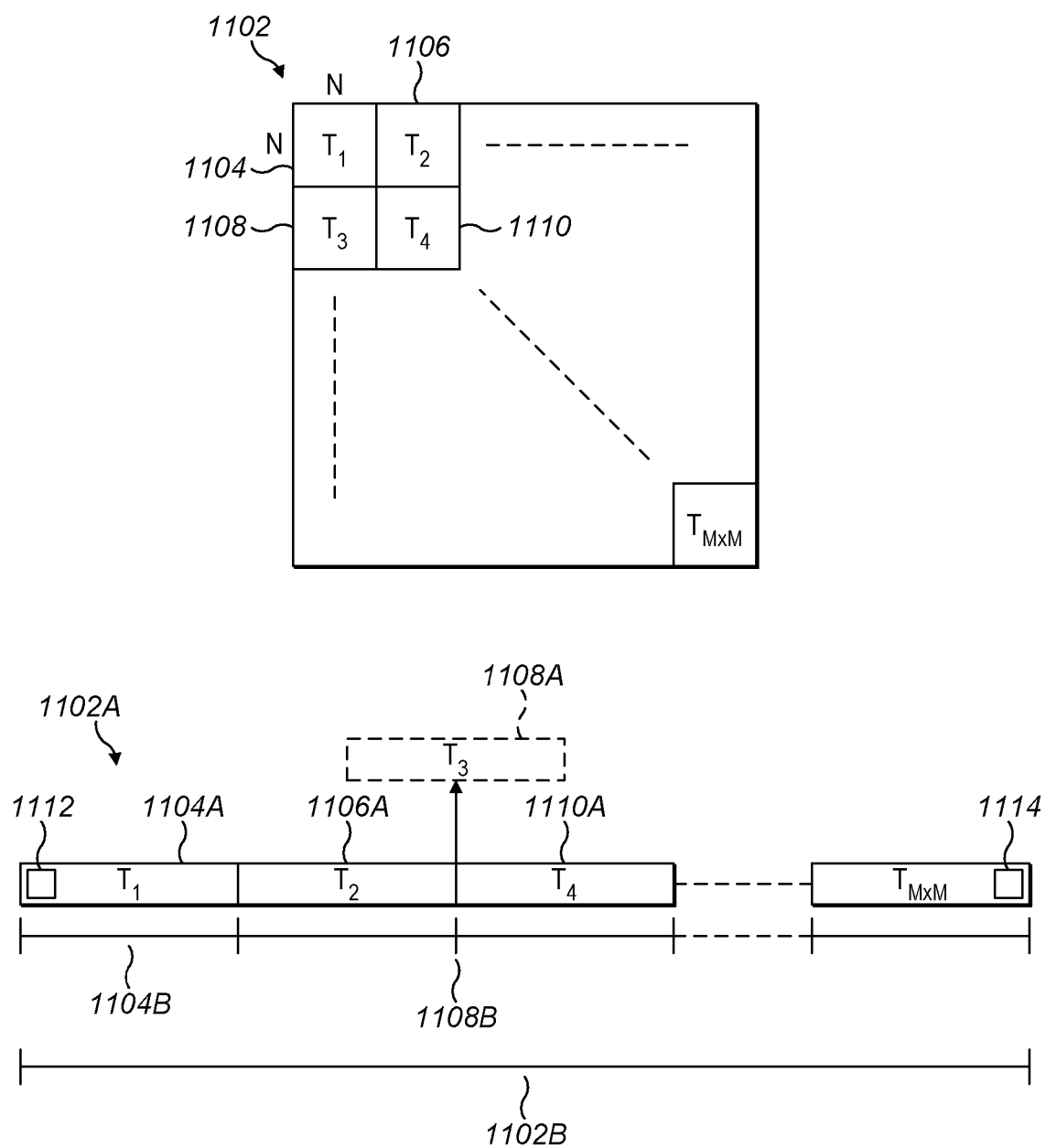
FIG. 11 is an example of the relationship between a Tableau of streamlength for a grid of Tesserae, and the encoded stream according to an aspect of the invention.

FIG. 11 shows a representative example of a grid, or stack of Tessera.

In FIG. 11 there is shown the frame represented by a grid of Tesserae 1102 comprising M rows and M columns of Tessera.

For ease of understanding, only a subset of the M×M Tessera are displayed. An individual Tessera, e.g. 1104, represents a fixed size N×N block of data. Squares 1104, 1106, 1108, and 1110 all represent blocks of data associated with Tesserae. A Tessera further comprises a quadtree which is not shown on FIG. 11 for ease of understanding.

The data represented by a Tessera may contain at least one non-zero value. For example, the data represented by Tesserae 1104, 1106, and 1110 all contain at least one non-zero value. Tessera 1108 represents data with only zero values. Accordingly, Tessera 1108 is considered empty, as it is not associated with any residual data.

FIG. 11 further shows a schematic representation of a stream of data 1102A corresponding to the grid of Tesserae 1102. Stream 1102A is a concatenation of individual Tessera streams, 1104A, 1106A, etc. A stream 1104A has a corresponding streamlength 1104B. As described above, a Tessera 1104 is encoded as a sequence of values 1104A defining the residual data, the 8×8 LOS, 4×4 LOS 2×2 LOS, and any further data used to represent a Tessera. Said sequence of values is referred to as a stream. The streamlength is the number of bits (or bytes) needed to define a set of data in a stream. Accordingly, the streamlength 1104B corresponds to the number of bits (or bytes) required to define Tessera 1104 represented by stream 1104A.

The amount of data within a Tessera, and therefore the streamlength of a Tessera, will depend on the amount of data used to encode a Tessera. As the amount of data to be stored is variable, depending on for example the extent of the residual data present, the streamlength for each Tessera is also variable.

For example, if the rate is set at 0.5 bits per element, then for a 16×16 Tessera with all non-zero values and 3 LOSs, the number of bits required to encode the Tessera will be defined as:

$$16 \times 16 \times 4 \times 0.5 \text{ bits per element} = 512 \text{ bits} = 64 \text{ bytes} \qquad (1)$$

As the data is sparsified, the elements which contain no data (i.e. those having a zero value of residual data, or a value below a threshold) are not encoded. Therefore, the streamlength for a Tessera, and the individual elements within a Tessera, needs to be stored as part of the encoding process so that the Tessera can be properly decoded.

The stream 1108A of an empty Tessera 1108 has length 1108B equal to zero. In an embodiment streamlength 1108B is still recorded in the stream 1102A so as to indicate that a Tessera is in the grid 1102 but is empty.

The total streamlength 1102B of a stream 1102A is given as the summation of the streamlengths of each Tessera in the grid of Tesserae 1102. Therefore, the streamlength 1102B corresponds to the streamlength required to encode the frame of video data using the described approach In an embodiment, a stream, e.g. 1102A representing a grid of Tessera 1102, can be encoded and decoded using sequential encoding and decoding.

Sequential encoding encodes a stream in a set order so that the stream can be subsequently decoded in the same order. In an embodiment, the order is a z-order traversal as found from a depth first traversal of a Tessera's quadtree structure. In further embodiments, other orderings may be used.

An aspect of the invention is that a frame of video data can be encoded and decoded in parallel, and/or in a non-sequential manner, using the Tessera abstract data type described above. Advantageously, this allows for individual parts of a frame to be decoded separately, without having to decode the data in a sequential manner.

With reference to FIG. 11, each individual Tessera, e.g. 1104, 1106, etc. that form the large grid of Tesserae 1102, can be encoded and subsequently decoded independently of any other Tessera. In the following description, a Tessera that is used to represent residuals data is also named a "Tile", whilst a Tessera that is used to represent metadata is also named as a "Tableau".

To allow for parallel encoding and decoding, the location of a Tessera on a grid of Tesserae needs to be known. For example, with reference to FIG. 11, to encode and subsequently decode Tessera 1110, its location on the grid of Tesserae 1102 needs to be known. The location of Tessera 1110 on the grid of Tesserae 1102 is correspondent to the location of stream 1110A within the larger stream 1102A.

Therefore, an aspect of the invention is the identification of the location of data relating to a given Tessera, or a plurality of Tessera, within a stream of data, which represents a grid of Tesserae, to allow for parallel encoding and decoding of said grid of Tesserae. This aspect further allows partial decoding of a stream of data; that is, an individual Tessera can be decoded without the requirement of any preceding Tessera also being decoded. This aspect is achieved by using a Tessera to define a grid of Tesserae.

As an example, with reference to FIG. 11, to decode Tessera 1110 using sequential decoding, the preceding tiles 1104, 1106, and 1108, would need to be decoded first by decoding their streams 1104A, 1106A, and 1108A. To decode the Tessera 1110 using parallel decoding, the location of the stream 1110A corresponding to Tessera 1110 within the overall stream 1202A needs to be known.

As described above, a key aspect of the invention is that a Tessera can be used to define a grid of Tesserae. Such a Tessera is referred to herein as a Tableau. A Tableau of size N×N, records metadata. In an embodiment, the metadata recorded is the streamlength of each Tile in an N×N grid of Tiles (in the case the Tableau belongs to Tier-1 as described further below) or the streamlength of each Tableau in a grid of Tableaux (in the case the Tableau belongs to Tier-2 or above as described below). Whereas a Tile records residual information for an N×N block of data, a Tableau records metadata for an N×N arrangement of Tesserae.

Each Tile is referred to as belonging to Tier-0. The corresponding Tableau is referred to as belonging to Tier-1. Accordingly, an aspect of the invention is that a hierarchy of Tesserae are formed to represent a large grid unit.

Figure 12:
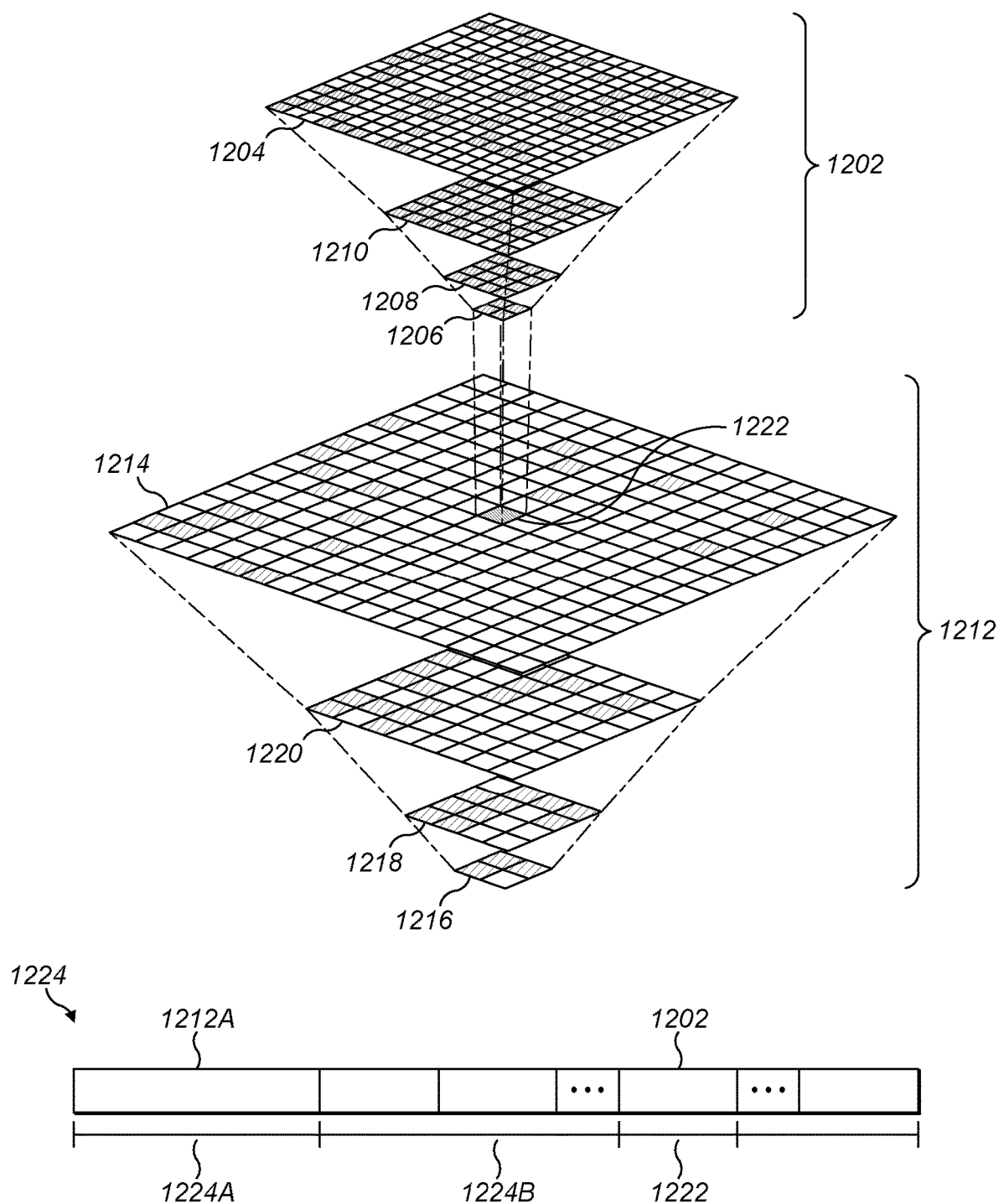
FIG. 12 is an example of the relationship between Tier-0 and Tier-1 Tesserae according to an aspect of the invention.

FIG. 12 shows a representative example of the relationship between Tier-0 and Tier-1 Tesserae, and the encoded stream 1224 of the two tiers.

A single Tier-0 Tessera 1202 is shown. Tessera 1202 is a Tessera of residual data (i.e., a Tile) and comprises a 16×16 grid 1204 of residual data. Tessera 1202 further comprises a 2×2 LOS 1206, a 4×4 LOS 1208, and an 8×8 LOS 1210.

A single Tier-1 Tessera 1212 is shown. Tessera 1212 is a Tableau and comprises a fixed size encoding unit 1214 of metadata, for example streamlengths. Tableau 1212 further comprises a 2×2 LOS 1216, a 4×4 LOS 1218, and an 8×8 LOS 1220.

Tableau 1212 defines a grid of metadata associated with the Tiles at Tier-O. Each non-zero element of Tableau 1214 records the metadata, for example streamlengths, of a Tile at that position in the grid of Tiles. As an example, element 1222 of Tableau 1212 corresponds to the total streamlength needed to encode Tile 1202.

The Tier-1 and Tier-0 Tesserae form a single stream 1224. Stream 1224 is read left to right such that the portion of the stream relating to Tier-1 1224A is read before the portion relating to the Tier-0 Tesserae 1224B.

In the example shown in FIG. 12, partial or parallel decoding can be performed by decoding the initial portion 1212A of stream 1224 relating to Tableau 1212. Tableau 1212 is then traversed using the same traversal order used during encoding (e.g. z-order traversal). During traversal, a mapping function may be applied to obtain the decoded streamlength values. Said decoded streamlength values then allow for portions of the Tier-0 stream 1224B to be read and decoded in parallel.

Figure 13:
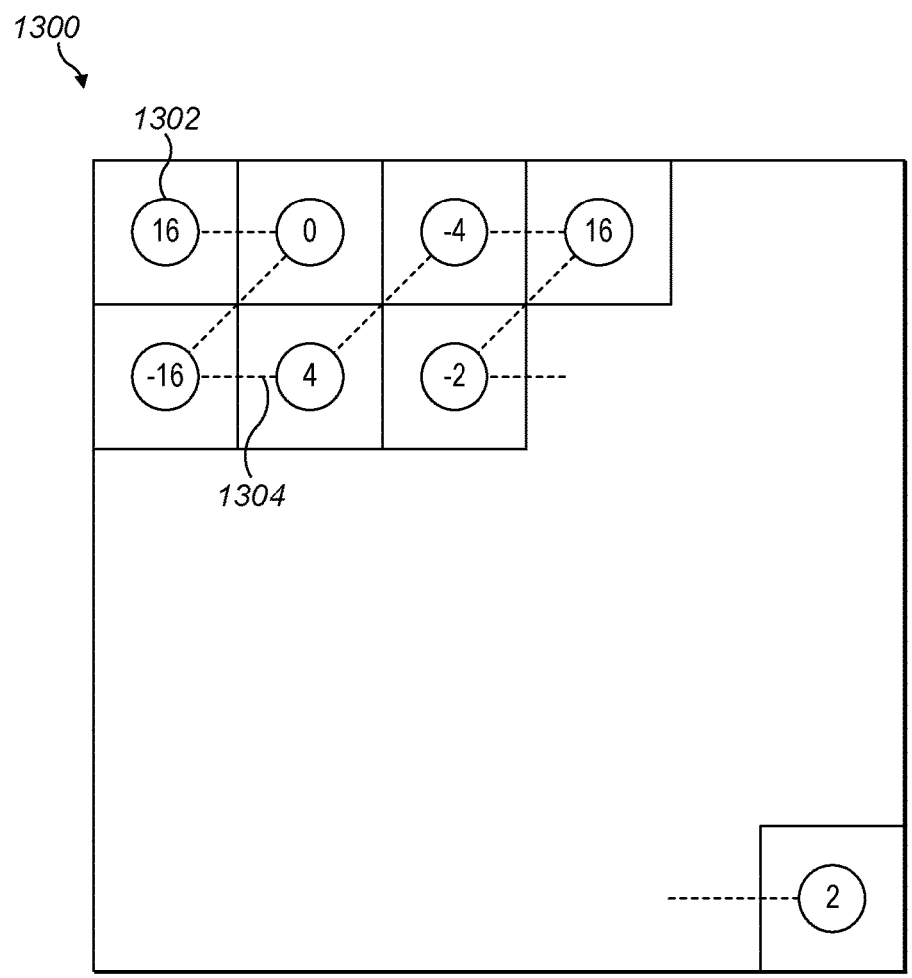
FIG. 13 is an example of how streamlengths are decoded from a Tableau according to an aspect of the invention.
Figure 13:
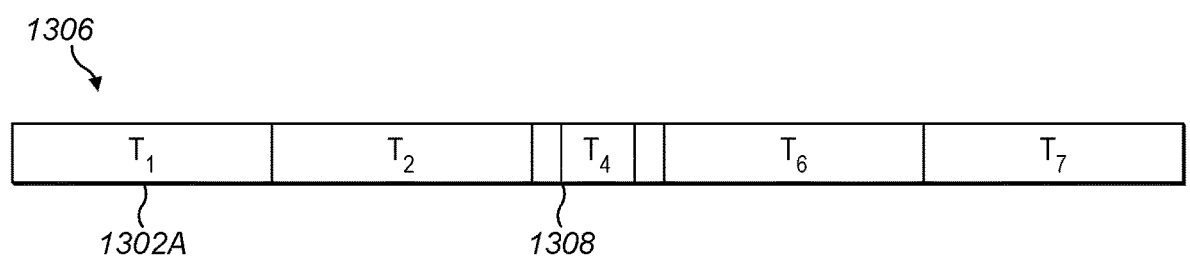

FIG. 13 shows a representative example of how streamlengths are decoded from a Tableau.

A Tableau 1300 is shown, composed of N×N elements. For ease of understanding a subset of the total number of elements are displayed. Each element corresponds to the streamlength of an associated Tile. For example, element 1302 contains the value 16 indicating that 16 bytes are required to read the Tessera of residual data associated with element 1302.

The elements of Tableau 1300 are visited in a set order 1304. This order corresponds to a z-order traversal of the elements. The same traversal is used for encoding the elements of the Tableau as is used for decoding. In further embodiments, another order may be used to visit the elements of Tableau 1300.

FIG. 13 further shows a stream 1306. The stream 1306 corresponds to the stream of the grid of Tiles that Tableau 1300 defines. Stream 1306 can therefore be understood to comprise one or more portions of data, said portions relating to individual Tiles. For example, portion 1302A of stream 1306 corresponds to the encoded stream of Tile $T_1$. Accordingly, portion 1302A has a streamlength 1302 defined in Tableau 1300.

If the elements of Tableau 1300 were encoded using a mapping function, said elements must be decoded using the inverse of said mapping function. For example, in the example shown in FIG. 13 a prefix difference mapping function, as defined in Equation 4, is used during encoding, and therefore a prefix sum mapping function as defined in Equation 5 should be used to decode the values. For example, the values [16, 0, −16, 4, −4, 16, −2] would be converted using Equation 5 into the actual streamlengths sequence as [16, 16, 0, 4, 0, 16, 14], meaning that Tile T1 has a streamlength of 16, Tile T2 has a streamlength of 16, Tile T3 has a streamlength of 0 (and in fact is not present in stream 1306), Tile T4 has a streamlength of 4, Tile T5 has a streamlength of 0 (and in fact is not present in stream 1306), Tile T6 has a streamlength of 16 and Tile T7 has a streamlength of 14. Thus, if only Tile T6 need to be decoded, the decoder would first compute the streamlengths up to Tile T5 by summing the streamlengths of Tiles T1 to T5, in this example 36 bytes, and then would skip the first 36 bytes and decode the next 16 bytes knowing that those bytes correspond to Tile T6.

The use of Tableaux in Tier-1 allows for massively parallel decoding as a plurality of decoders can be used to decode portions of the frame by using Tableau 1300 to find the location of said portion of data within stream 1306.

Figure 14:
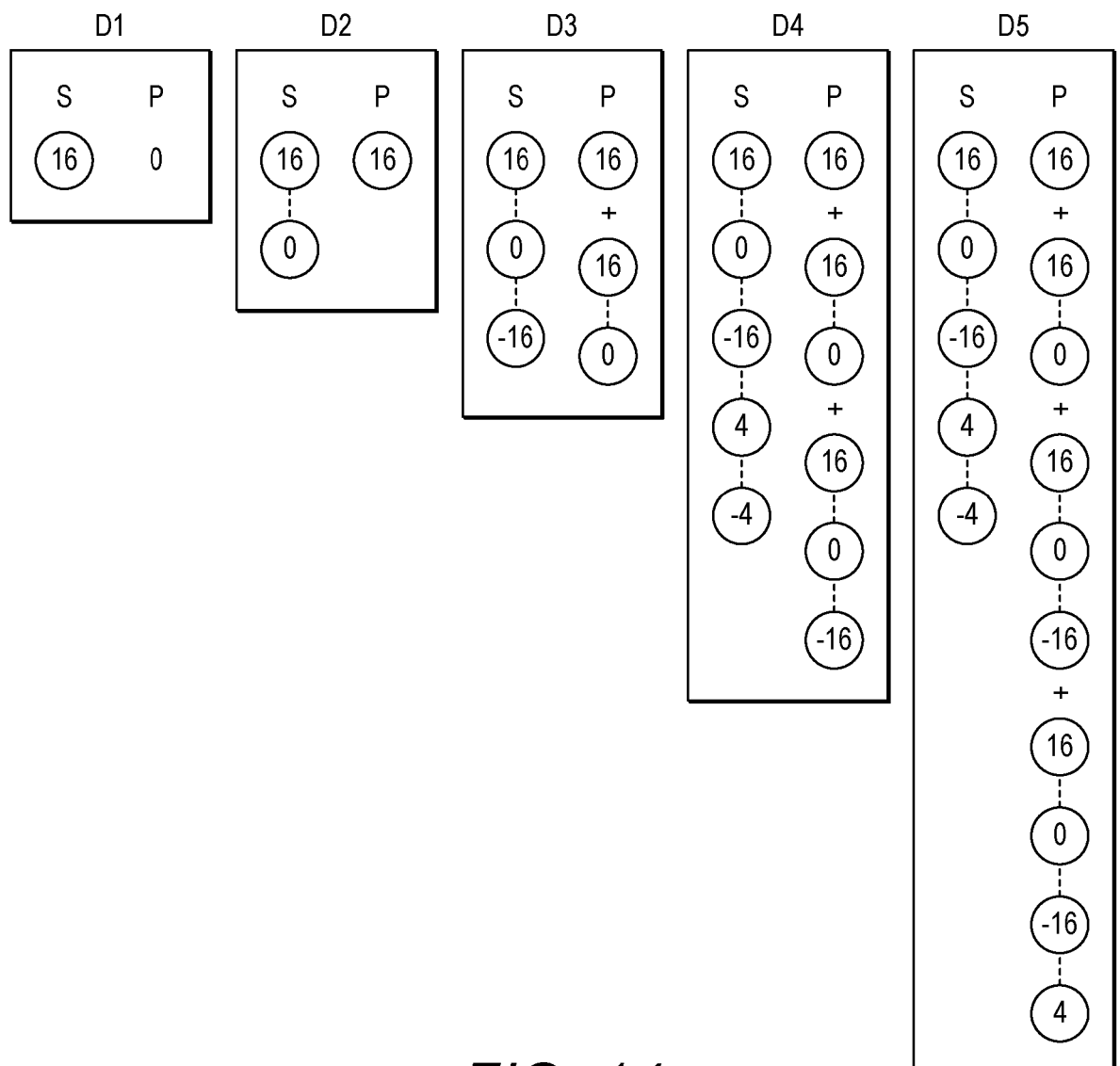
FIG. 14 is an example of how decoders can use a Tableau's streamlengths to decode in parallel according to an aspect of the invention.

FIG. 14 is an example of how four decoders can be used in parallel to decode the first four Tiles represented by Tableau 1300 of FIG. 13. In general, each Tile can be decoded by a separate decoder thus allowing massively parallel decoding to take place.

For example, if the streamlengths are encoded as in FIG. 13 using the difference mapping function, each decoder would traverse the quadtree of Tableau 1300 to obtain a streamlength (S) and a position (P) of a Tile in stream 1306. The streamlength would be computed as the sum of element values on Tableau 1300 encountered during traversal. The position would be computed as the cumulative sum of element values on Tableau 1300 encountered during traversal.

As an example, with reference to FIG. 13 and FIG. 14, decoder D4 decodes Tile $T_4$. The streamlength of Tile $T_4$ in stream 1306 is given as the sum of values encountered during traversal: (16+0−16+4)=4. Therefore, 4 bytes are required to decode Tile $T_4$. The position 1308 of Tile $T_4$ in stream 1306 is given as the cumulative sum of values encountered during traversal: (16)+(16+0)+(16+0+−16)=32.

However, if the streamlengths in Tableau 1300 were recorded as the actual streamlengths, namely as [16, 16, 0, 4, 0, 16, 14] in the example of FIG. 13, then the decoder could compute the streamlength (S) of a Tile as the actual value read in the position corresponding to that Tile, and the position (P) of a Tile as cumulative sum of element values on Tableau 1300 encountered during traversal. For example, using again the example of Decoder D4 decoding Tile $T_4$, the streamlength would be the value found in position 4 of the traversal (i.e., 4) and the position would be 16+16+0=32.

Therefore, an aspect of the invention is that frames of video can be encoded and decoded in parallel to allow for massive parallelisation and partial decoding.

One important aspect of the present invention is that, in the same way that the Tessera structure allow to decode each Tile separately in a parallel manner (for example using a separate decoder for each Tile), also each Tile can be encoded separately by using a separate encoder for each Tile. As the Tessera defines the streamlength for each Tile, in the above described manner, the data for each Tile can be extracted and processed independently. Furthermore, as the Tiles do not have an interdependence, unlike in many encoding systems, there is no requirement to have any knowledge of neighbouring Tiles decode a Tile.

Various encoding schemes could be used to encode the various Tesserae. In an embodiment, Huffman Coding is used to encode and compress a stream in parallel. Accordingly, Huffman Coding is used to decode a stream in parallel. In such an embodiment, Huffman Coding may also be used to decode a stream sequentially. In a further embodiment, if Huffman Coding is used to encode a stream sequentially, then a stream may be decoded using Huffman Coding in parallel or sequentially.

In an embodiment, Arithmetic Coding is used to encode and compress a stream in parallel. If Arithmetic Coding is used to encode and compress a stream in parallel, then an encoded stream is decoded in parallel. In a further embodiment, Arithmetic Coding is used to encode and compress a stream sequentially, and Arithmetic Coding is used to decode a stream sequentially.

Figure 15:
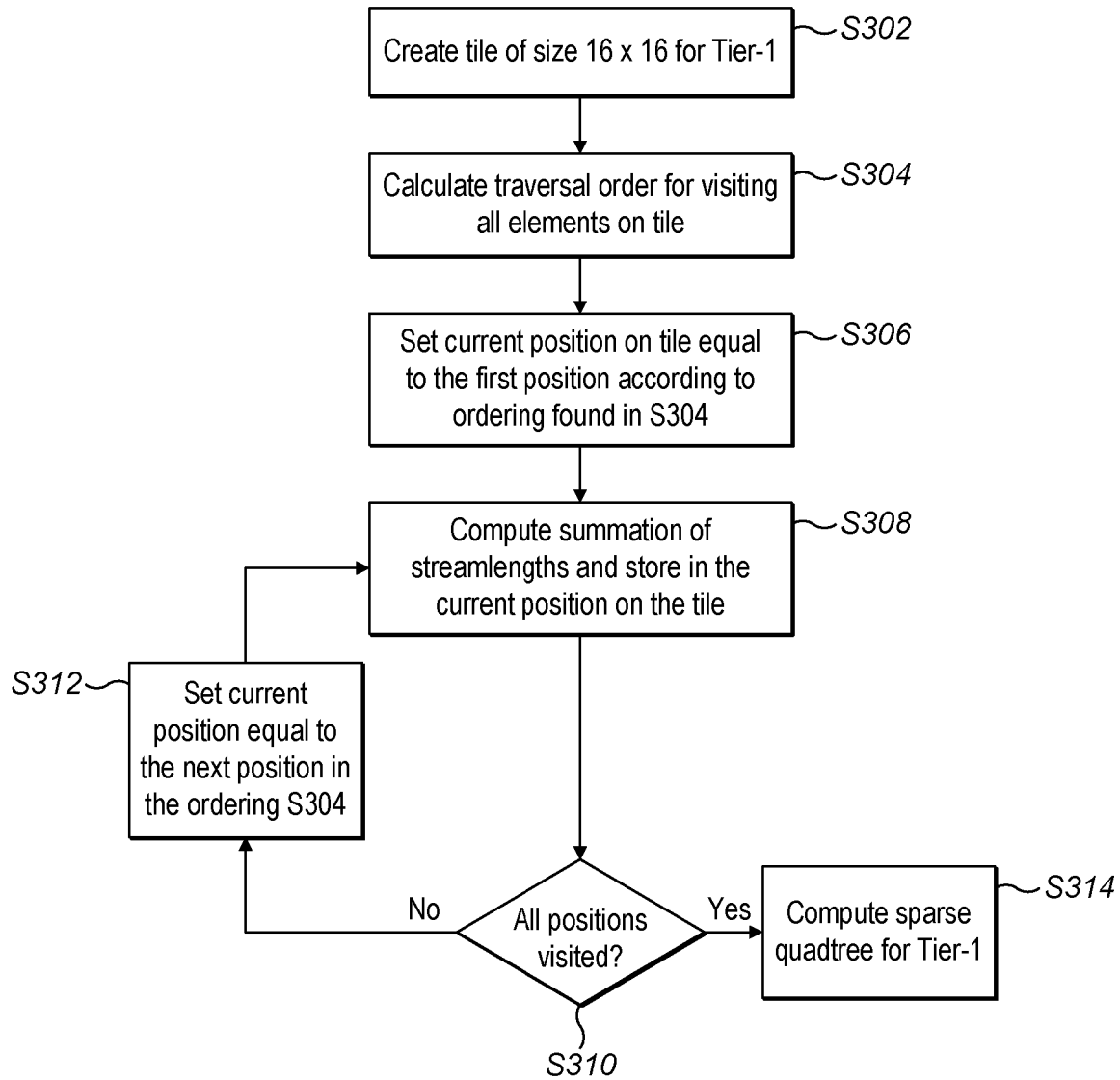
FIG. 15 is a flowchart for the creation of a Tier-1 representation according to an aspect of the invention.

FIG. 15 is a flowchart of the process of creating a Tableau, i.e. Tier-1 Tessera, used to define the metadata, for example streamlengths, of each Tile in the grid of Tiles comprising Tier-0 as described above.

Conceptually the following may be described as the extension of the principles described with reference to Tier-0. The elements which define each N×N Tile are combined so as to define a single entity.

The following description is made with reference to a frame of video data of size 256×256 elements and a fixed sized encoding unit of size 16×16 elements. This is a non-limiting example, and the below described process can be applied to a frame of video data of any size, e.g. 128×128, 512×512, 1024×1024, etc.

At step S302, a Tableau is created of dimension 16×16. As described above this Tableau is used to store the streamlengths of the residual information of each 16×16 Tessera of residual data. Note that other metadata associated with the Tiles could be stored in the Tableaux, for example metadata associated with the distribution of the residuals in the Tiles.

In an embodiment, a Tableau may be initialized such that each of its 256 elements are set to have the value "0". In such an embodiment, a first pass must be made over every element on the Tableau setting its value to zero.

In a further embodiment, every leaf node of a Tableau is visited and the value set accordingly.

The setting of the values is as described with reference to determining the values of the quadtree for Tier 0.

At S304, the order in which to visit each element of the Tableau created in S302 is determined. In an embodiment, the order is set to be the z-order traversal of the Tableau. This enables the elements of the Tableau to be visited in a sequential manner. In further embodiments, other orderings could be used such as random order, incremental row traversal, etc. Preferably the order is the same as used for the preceding tier (Tier-0).

At S306, a position is set to track which element on the Tableau is currently being visited. The current position on the Tableau is set to be the first position as found according to the traversal order computed at S304. A position on the Tableau refers to the location of a single element and in an embodiment can be an integer index corresponding to the traversal order of the elements of a Tableau. In a further embodiment, the position can be an integer tuple representing the row and column location of the element on the fixed size encoding unit of the Tableau.

At S308, the streamlength is computed. This corresponds to the total bits or bytes needed to encode the residual information of each of the Tiles. The streamlength is stored in the current location on the Tableau. In an embodiment, a mapping function is used to record the value to be stored. In an embodiment, this mapping function is identity (Equation 2). In further embodiments, other mapping functions may be used such as prefix difference (Equation 4).

At S310, a check is made to see whether all positions in the ordering found in S304 have been visited. If the result of this check is false, and there are still positions to be visited, then the process proceeds to step S312. At step S312, the current position is set to be the next position to visit in the list. If the result of the check at step S310 is true, then the process proceeds to S314.

At S314, the Tableau created in S302 now contains the streamlength information related to each 16×16 Tiles of the original 256×256 residual grid. As not every element of the Tableau will be non-zero, in a preferred embodiment the Tableau is encoded as a sparse quadtree. Therefore, at S314 the sparse quadtree structure for the Tableau is computed according to the means described above.

The sparse quadtree is defined in the same manner as described above with the reference to Tier-0. Again, the data is encoded in a strictly bottom-up manner in order to sparsify the data.

The above process may be repeated as many times as necessary in order to define a desired frame size, and resulting in a further hierarchical tier e.g. Tier-2, Tier-3 etc., with each tier having its own sparse quadtree to map streamlengths of its constituent elements. The final hierarchical Tier will define a single Tableau.

In the following, a few examples are provided in order to illustrate how the Tiers are composed. For ease of reference, it is assumed that the size of a Tessera is 16×16, i.e. it contains 256 elements (e.g., residuals for Tiles, streamlengths for Tableaux). However, the same examples can be adapted to work with other dimensions, such as 32×32, 8×8, etc.

In a first example, we assume that a 256×256 pixels frame needs to be encoded. Accordingly, 256 Tiles will need to be used (i.e., (256/16)×(256/16)), and Tier-0 will be formed of said 256 Tiles. Since there are 256 Tiles, there will be 256 attributes associated with the Tile (e.g., streamlengths) to be recorded. Accordingly, a single 16×16 Tableau would be used and Tier-1 would be formed of this single Tableau.

In a second example, we assume that a 4,096×4,096 pixels frame needs to be encoded. Accordingly, 65,536 Tiles will need to be used (i.e., (4,096/16)×(4,096/16)), and Tier-0 will be formed of said 65,536 Tiles. Since there are 65,536 Tiles, there will be 65,536 attributes associated with the Tile (e.g., streamlengths) to be recorded. Accordingly, 256 Tableaux will need to be used, each containing 16×16 elements (256 in total) each associated with a Tile. Tier-1 will be formed of said 256 Tableaux. Since there are 256 Tableaux, it will be necessary to record the attributes of each of such Tableaux (e.g., their streamlengths). In order to do so, a single 16×16 Tableau containing 256 elements (each element associated with one of the Tableaux at Tier-1) will need to be used. There will therefore be a new Tier, namely Tier-2, containing said single Tableau.

From the examples above it is clear that the use of the abstract data structure called Tessera and the specific hierarchical use of them in a hierarchy of Tiles and Tableaux allows for any size frame to be encoded. The hierarchical structure would contain a number of Tiles in Tier-0, a number of Tableaux in Tier-1 and, when needed depending on the size of the frame to be encoded, also a number of Tableaux in Tier-2 and so forth. Below there are shown two tables illustrating some examples of frame size and the necessary Tiers associated with it.

TABLE 1

Tiers associated with frames to be encoded in the case of a 16 × 16 Tessera size

| Frame to be encoded (size in pixels) | Tier-0 | Tier-1 | Tier-2 | Tier-3 |
|---|---|---|---|---|
| 256 × 256 | 256 Tiles | 1 Tableau | N/A | N/A |
| 4,096 × 4,096 | 65,536 Tiles | 256 Tableaux | 1 Tableau | N/A |
| 65,536 × 65,536 | 16,777,216 Tiles | 65,536 Tableaux | 256 Tableaux | 1 Tableau |

TABLE 2

Tiers associated with frames to be encoded in the case of a 32 × 32 Tessera size

| Frame to be encoded (size in pixels) | Tier-0 | Tier-1 | Tier-2 | Tier-3 |
|---|---|---|---|---|
| 256 × 256 | 64 Tiles | 1 Tableau | N/A | N/A |
| 4,096 × 4,096 | 4,096 Tiles | 4 Tableaux | 1 Tableau | N/A |
| 65,536 × 65,536 | 4,193,304 Tiles | 4,096 Tableaux | 4 Tableaux | 1 Tableau |

As such it is possible to define the residual data, and the metadata required to decode the residual data in a sparsified structure for any size of frame. As described above, the 16×16 base element is preferred due to the associated advantages in speed of processing. However, in further embodiments other size of element may be used to encode data using the above principles.

Whilst the above process is applicable to frame of a set size, in practice video data may come in a variety of different frame sizes. Thus, the process must be flexible to accommodate different frame sizes.

In an embodiment, a frame of video data may be padded. This allows for frames of data whose size falls between Tesserae sizes to be encoded. For example, a frame of size 3840×2160 is to be encoded using the above described data structure. If a 16×16 base element is to be used, then the frame size falls between 256×256 and 4096×4096. Therefore, the frame is padded with a value, e.g. "0", to enable it to fit the size of 4096×4096.

Figure 16:
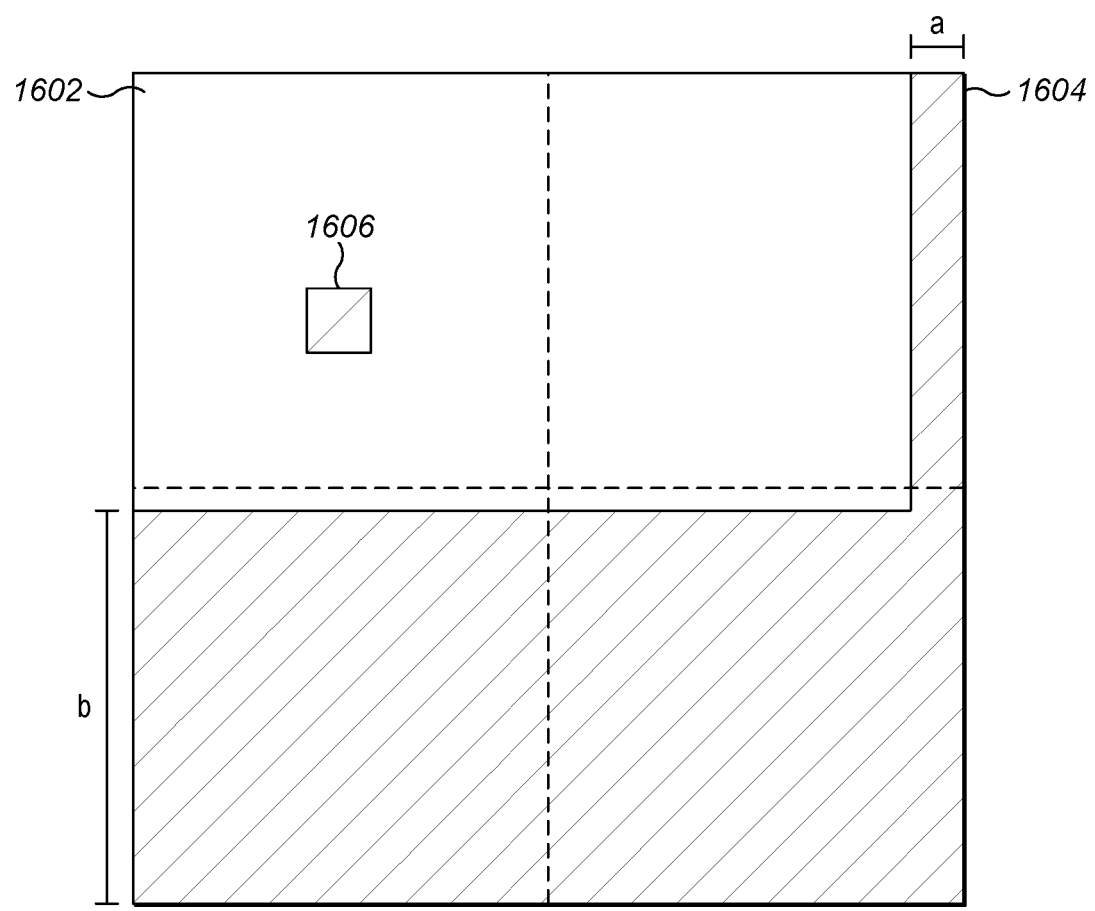
FIG. 16 is an example of active areas within a frame according to an aspect of the invention.

FIG. 16 shows a representative example of a frame that has been padded according to an aspect of the invention. Frame 1602 is of size 3840×2160. Frame 1602 has been padded to include an additional a columns and b rows of data to produce a padded frame 1604. Frame 1604 is of size 4096×4096 and can be represented using the data structure described above with a 16×16 base element.

In another aspect of the present invention, an Active Area is defined. An Active Area defines an area of interest within a frame such that areas outside of an active area can be ignored during the decoding process.

An aspect of the invention is that using the above described data structure allows for active areas to be decoded without the need for the entire frame to be decoded. This could enable, for example, partial decoding of images and/or other features such as zooming.

Figure 17:
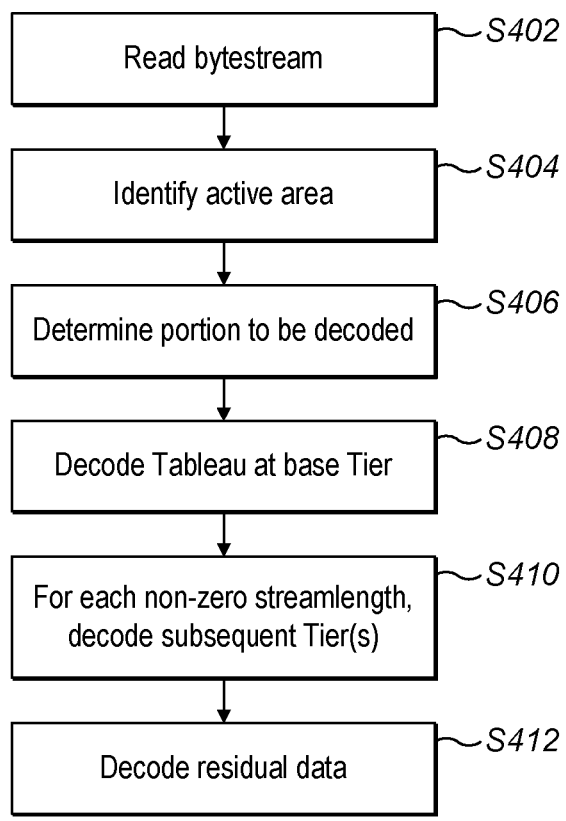
FIG. 17 is a flowchart for decoding an active area according to an aspect of the invention.

FIG. 17 is a flow chart of the process of decoding a frame of encoded data. The encoded data is encoded in the above described manner to define multiple tiers of data.

The decoding process occurs for an entire frame of data or for an Active Area of the frame. In this example, the frame of data to be decoded corresponds to a frame of residual data. The skilled person will appreciate that this is not a limiting factor and the below described method can be applied to a frame of data that is not residual data, e.g. pixel intensity, chroma, metadata, etc. In an embodiment, the Active Area is the entire frame of data. Where the entire frame of data is decoded the process occurs in the manner described below with all areas being identified and decoded.

At step S402 an encoded stream is received at a decoder. The stream is encoded using the above described method. The encoded data comprises the encoded residual data and plurality of tiers of data, each tier having the format described above.

At step S404, an Active Area may be identified. In an embodiment, the encoder identifies the Active Area and this information is sent to the decoder as part of the stream. In a further embodiment, the decoder has a-priori knowledge of where the active area is. In a further embodiment, the decoder selects the Active Area to be decoded, for example based on an external input or based on other criteria/decisions.

In an embodiment, the Active Area is the entire frame of data.

Preferably the data stream received at the decoder comprises the data encoded at plurality of levels of quality, or quantisation and the decoder receives information regarding which level of quality, or quantisation to be decoded.

As step S406, the portion of the stream corresponding to the Active Area is identified.

As described above the process may occur with the use of multiple decoders, each decoder focusing on a specific area of the frame. For ease of understanding the following is described with reference to a single decoder, though in further embodiments multiple decoders may be used.

The following is described with reference to a frame having multiple tiers of data Tier-0 (the residual data and the data structure describing the distribution of the data), Tier-1 (the tableau streamlengths of the Tiles), and Tier-2 (the tableau of the streamlengths of the tableaus of Tier-1).

The encoded data in an embodiment is encoded in a sequential manner using a z-order traverse. The data is therefore decoded in the same sequence. Where the Active Area defines a portion of the frame, each tile in the active is identified and decoded in the same order.

At step S408 the Tableau of the highest Tier of data, for example Tier-2, is decoded. As defined above, the highest Tier of data comprises a single Tableau, said Tableau defining the streamlengths of the Tiles (in the case of the highest Tier being Tier-1) or the Tableaus of the preceding Tier (in all other cases).

The Tableau of the highest Tier is decoded and the streamlengths for the elements of the Tableau determined.

As described with reference to FIG. 11 the data for the streamlengths of the tile is defined in the Tableau. Furthermore, each Tableau is defined in the sparse quadtree structure. As defined above, with reference to FIG. 4, the sparse quadtree maps the data is traversed in a bottom-up manner from the lowest level to the highest level, preferably in a depth-first manner. Thus at step S406 the decoder will visit the sparse quadtree for the Tableau, in the same order in which it has been encoded. The lowest level nodes are visited and as described above, each parent node has exactly four child nodes. If the parent nodes are empty, that is to say they have a value below a threshold value, such as zero, then by definition all other inner nodes for the Tableau are empty. Accordingly, for any tile which is in a node of the sparse quadtree which has a zero value it is known that no data (for example residual data) exists for that tile. Accordingly for any tile that is defined in the Tableau sparse quadtree by a node with a zero value there is no data and no need to decode the tile.

As described above if the node has a value above a threshold, for example a non-zero value, then the sparse quadtree is traversed in the depth first manner until such time that either the inner leaf node value is below the threshold (and indicates that no data is present) or the highest level is reached, which indicates that the tile associated with the highest level has a streamlength and therefore has some form of data, such as residual data associated with it.

The above process is repeated for all elements of the Tableau. Where the Tableau is a 16×16 step S408 may return up to 256 non-zero streamlengths. Elements which have a zero streamlength are known to have no residual associated with them and no further decoding is required. Each non-zero streamlength corresponds to data in a Tessera in the next Tier. For example where the Tableau decoded at step S408 corresponds to Tier-2, each non-zero value corresponds to data in a Tessera in Tier-1.

As step S410 the preceding Tier of data is decoded. For example where Tier-2 was decoded at step S408, Tier-1 is decoded at step S410.

The location of the data for the Tier in an embodiment is calculated, or in further embodiments is provided to the decoder. The location of the start of the Tier in an embodiment is based on a summation of the data required to encode the Tier decoded at step S408, e.g. Tier-2.

The Tier is decoded in the same manner as described with reference to step S408. As the decoder is provided with the information of the Tessera which contain no data these Tessera may be skipped thereby increasing the speed of the decoding process.

This process is repeated until Tier-0 has been reached.

At step S412 the decoder has decoded the all the streamlength data for the Tiers of interest. At step S412 based on a summation of the streamlength data the location of the residual data for each tile is identified and subsequently decoded. The decoding of the residual data occurs in a known manner. As the above process identifies the Tiles, and elements of the Tiles, which contain data, the Tiles which are identified as not containing data (those which have a zero streamlength) are not decoded thereby resulting in a faster decoding process.

An aspect of the invention is that the use of Active Areas allows for partial decoding. With reference to FIG. 16, the Active Area 1602 can be decoded without the need to decode the regions of the frame outside of Active Area 1602. Furthermore, Active Area 1606 which defines a region within Active Area 1602 can be decoded without the need to decode the entire tile. In such a case, any region of frame 1604 not contained within active area 1606 is considered not necessary for decoding, even if said region is within previously mentioned active area 1602.

An aspect of the invention is that the use of active areas allows for parallel decoders.

Figure 18:
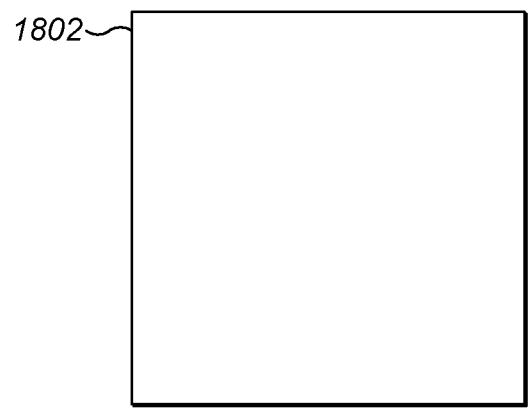
FIG. 18 is an example of parallel decoders being assigned separate active areas according to an aspect of the invention.
Figure 18:
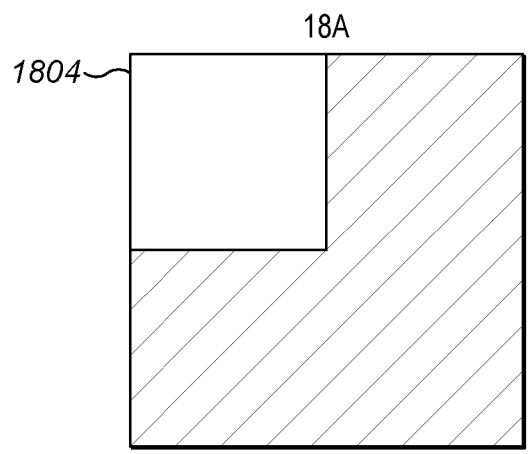
Figure 18:
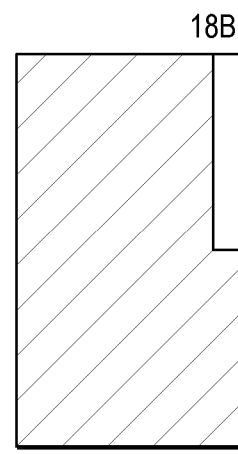
Figure 18:
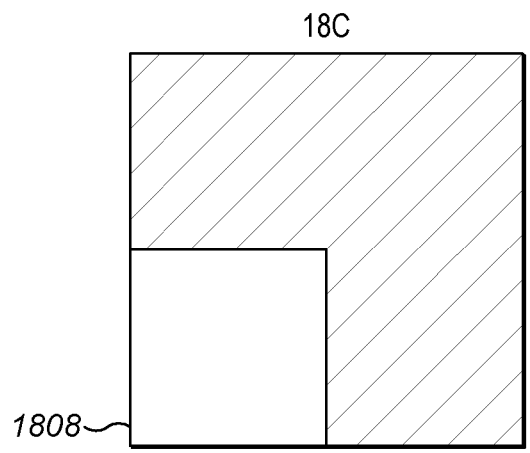
Figure 18:
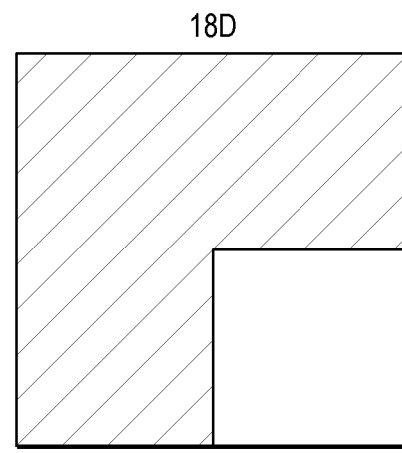

FIG. 18 shows an example of the use of active areas to allow for parallel decoding according to an aspect of the invention.

A frame of data 1802 is to be decoded. Four decoders are to be used in parallel to decode the frame. According to an aspect of the invention, each decoder decodes a different active area corresponding to the region of the frame to decode.

In an embodiment decoding an Active Area will require decoding of the Tiles as well the Tableaux in the hierarchy of tiers needed to map the location of that active area. For any such active area, it is potentially necessary to decode certain pre-requisite Tesserae within one Tier before certain Tesserae in a remaining Tier, in accordance with a prescribed ordering of Tiers. Hence, in the case of FIG. 18, using multiple decoders working on separate Active Areas, in an embodiment there may among the decoders be an overlap in their individual sets of pre-requisite decoded Tesserae of earlier Tiers. In such embodiments, a shared pre-requisite Tesserae only need to be decoded once. In an embodiment, the decoder has the option to use this property or not. In such embodiments, decoding could be started by a single decoder or a smaller number of decoders and be taken over by a larger number of decoders once some common pre-requisite Tesserae have been decoded.

FIG. 18A shows the active area 1704 defined for a first decoder.

Frame 18B shows the active area 1706 defined for a second decoder.

Frame 18C shows the active area 1708 defined for a third decoder.

Frame 18D shows the active area 1710 defined for a fourth decoder.

Accordingly, the invention allows for massive parallelisation of the decoding process. A plurality of decoders may be used to decode distinct tiles of the frame without the need for each decoder to decode the entire frame.

Whilst the above is described with reference to the encoding of a frame of video data at a first level of quality e.g. at a first resolution or at first level of quantisation, in further embodiments the process may be repeated for a plurality of levels of quality, each level of quality is encoded in the above described manner. As is known the data stream may therefore comprise of multiple levels of quality, preferably encoded in a hierarchical manner. Advantageously, unlike in other hierarchical encoding techniques there is no dependence between the levels of quality thus allowing each individual level of quality to be encoded/decoded independently, optionally via multiple encoders/decoders. Furthermore, utilising the principles described above multiple active areas can be defined, each active area being associated with a different level of quality. In further embodiments one or more levels of quality may be associated with a lossy encoding and one or more levels of quality associated with lossless encoding. Thus, the invention allows for the switching between lossy and lossless encoding. Preferably where multiple levels of quality are encoded the lowest level of quality is encoded first, thus allowing for the content to be received and decoded in low bitrate environments.

An aspect of the invention is that a frame of video data may be at least partially decoded in the event of truncation or interruption. Truncation occurs when the link, e.g. network 114, fails to send the whole encoded stream due to a lack of bandwidth or service interruption. As the encoding is performed on a per tile basis, without reference to tiles in the same level of quality, nor tiles in different levels of quality, all complete tiles can be decoded. Any tiles which are missing, in an embodiment, are considered to have zero residual data (and therefore do not have an associated quadtree and a streamlength of zero).

Figure 19:
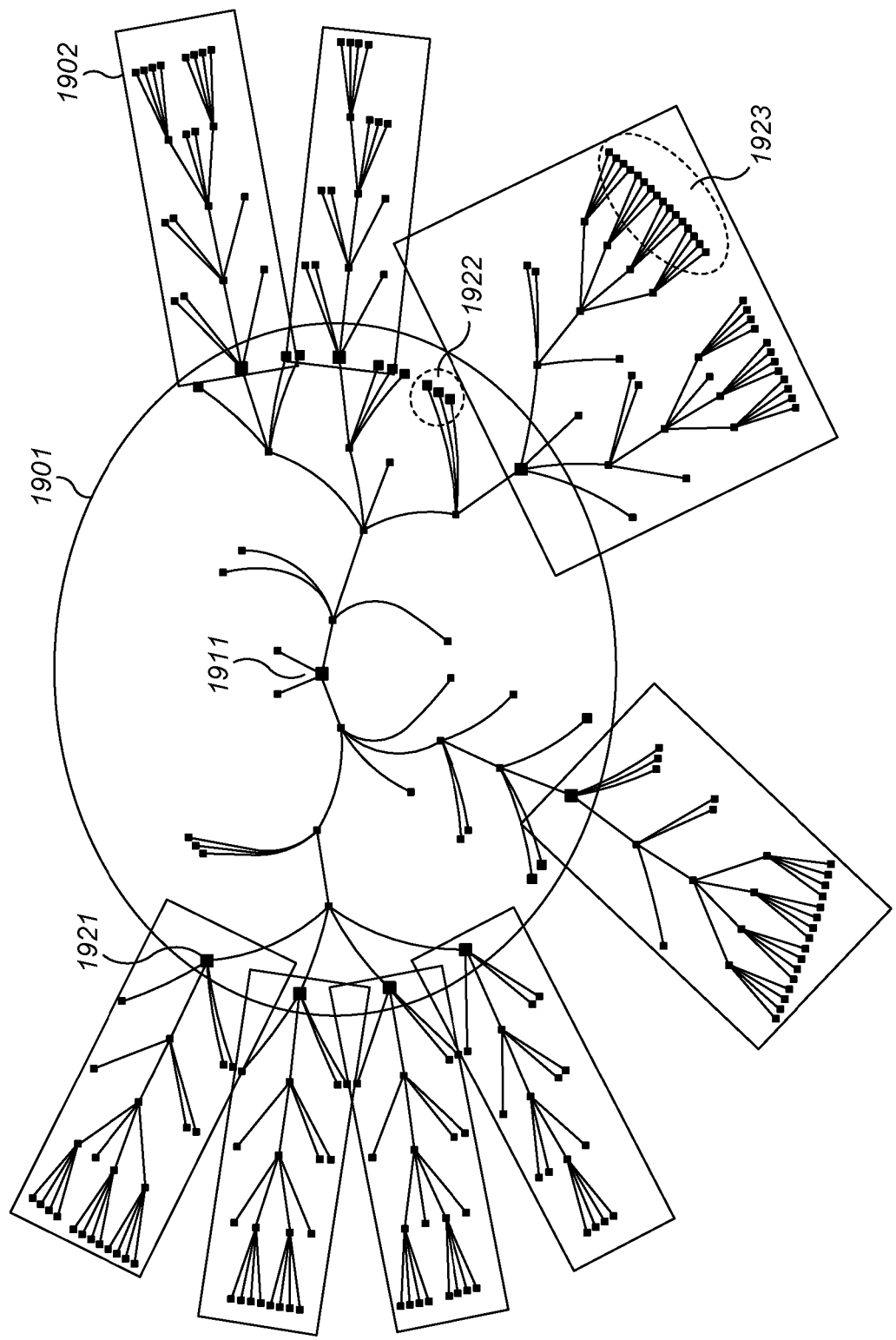
FIG. 19 is an example of an example of a data structure according to an aspect of the present invention.

FIG. 19 shows an example of a data structure according to the present invention.

In particular, the figure represents an example of a tree structure associated with a frame. In the example shown, there are nine Tesserae (the tree structures included in the boxes with a continuous line), and in particular 1901 would represent a Tableau (corresponding to Tier-1 or also known as a Root Tier—since it is the lowest Tier available in the present example) whilst the eight Tesserae 1902 represent Tiles (collectively forming Tier-0). Each Tile is formed of four levels of nodes and one level of leaves, with the root node 1921, three levels of intermediate nodes and the leaves 1923 corresponding to the data to be encoded (e.g., residuals)—there are a total of 88 data to be encoded in FIG. 19.

The Tableau 1901 has a similar structure, with a root node 1911, three levels of intermediate nodes and leaves. In the case of the Tableau 1901, the leaves could either be the roots of the Tiles 1921 or leaves 1922 who have no children. The present structure clearly shows how the present invention enables sparsification of the data to be encoded. As discussed, there are only 88 data to be encoded in the present frame, and the tree structure is designed to allow traversing the structure starting from root node 1911 to arrive at the data to be encoded (e.g., residuals 1923) without having to travel across those branches who have no residuals attached. So, for example, if during traversal we arrive at leaves 1922, since there are no residuals associated with those leaves, there is no need to further traverse and leaves 1922 would be terminal leaves. If instead we arrive at a leaf 1921 which corresponds to the root node of a Tile, we would continue traversing the Tile and arrive at the residuals by following a similar approach, i.e. traversing only those nodes which have children. The present figure also shows that each node can either have no children (e.g. see leaves 1922) or four children (e.g., see root node 1911).

Figure 20:
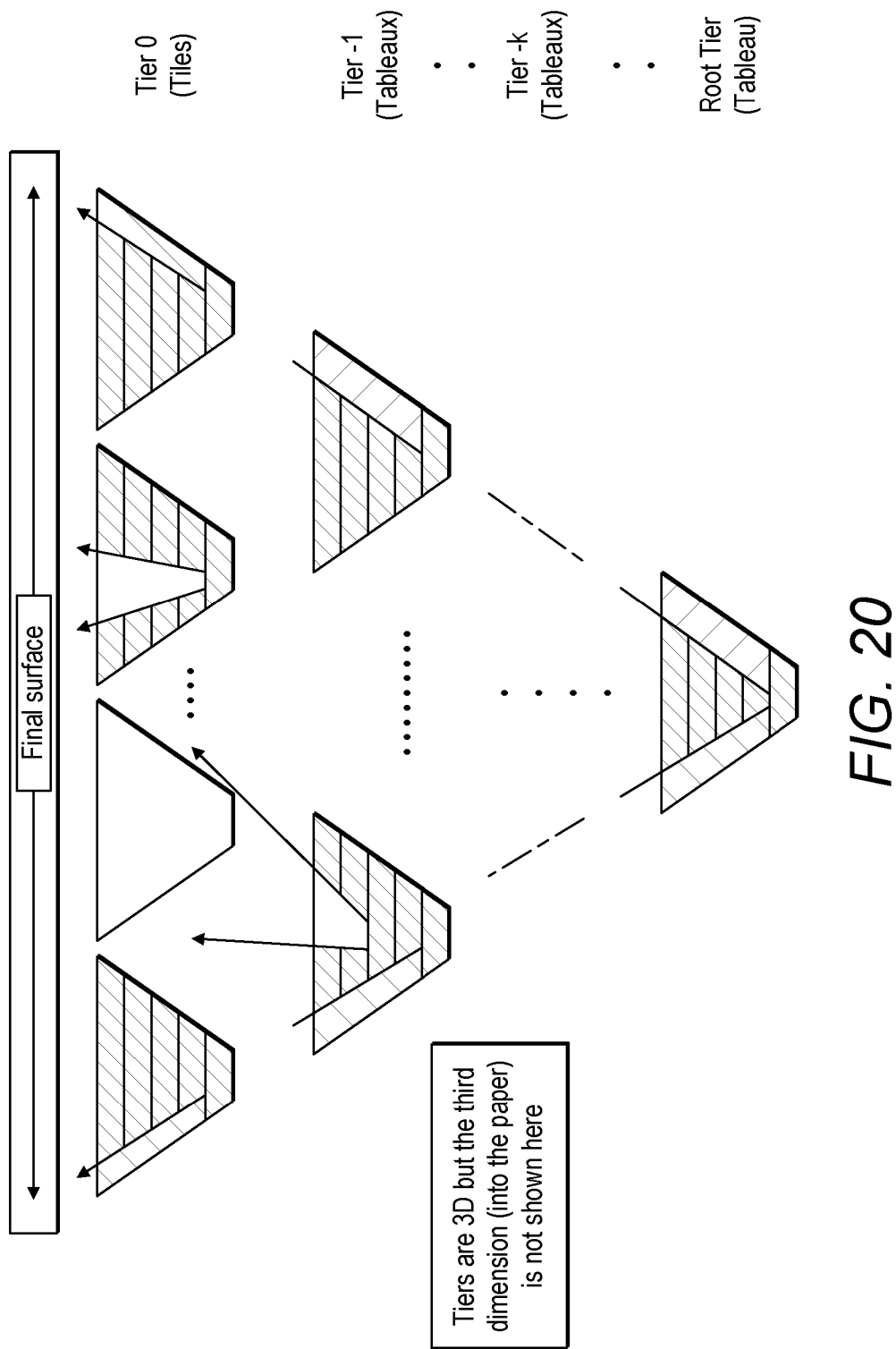
FIG. 20 a further example of a data structure according to an aspect of the present invention.

FIG. 20 shows another example of a data structure according to the present invention.

In particular, the figure shows how the various Tiers interact with one another, with Tier-0 corresponding to Tiles and the following Tiers (from Tier-1 to the Root Tier) corresponding to Tableaux.

FIG. 20 shows a cross section of a Surface (i.e. a grid of data to be encoded), and it shows how sparsification works across the Surface. In FIG. 20 the Tesserae (or portions of Tesseare) shown in the white identified areas of the Surface are areas where no data to be encoded are present. Areas where no data is present need not be encoded and are therefore areas where the structure is sparse. Areas where data is present are shown in grey and represent areas where data to be encoded are present.

Numbered Statements of Invention

1. A method of encoding a signal, the method comprising:
   obtaining a dataset to be encoded, said dataset being indicative of one or more properties of the signal;
   mapping the dataset into a data structure, said data structure defining instances of data, wherein the mapping of the data comprises the steps of:
   subdividing the dataset into a plurality of tiles, each tile defining a block of elements in said dataset;
   subdividing each tile into a plurality of sub-blocks;
   defining for each of the plurality of sub-blocks a corresponding node;

assigning a value to each node, said value indicating whether the sub-block corresponding to said node contains data above, equal or below a threshold value; and mapping the assigned values into a first level of the data structure.

2. The method of statement 1 wherein the dataset comprises residual data.

3. The method of statement 1 or 2 wherein the method comprises mapping the first level of the data structure in a sparsified manner.

4. The method of any preceding statement wherein the node comprises four sub-blocks.

5. The method of statement 3 or 4 wherein the mapping the first level of the data structure is as a sparsified quadtree.

6. The method of any of the above statements, wherein the method further comprises defining further levels of the data structure by:

grouping a plurality of nodes to define a plurality of parent nodes;

assigning a value to each of the parent node, the value indicating whether said parent node contains any data above, equal or below, the threshold value; and mapping the assigned values into a further level of the data structure.

7. The method of any preceding statement further comprising encoding the step of encoding the first frame of data and the data structure in a sequential manner.

8. The method of statement 7 wherein the sequential sequence is in a traverse z shape of the data sets.

9. The method of any of the above statements, wherein each element corresponds to a residual data.

10. The method of any of the above statements, wherein each element corresponds to a property associated with a residual data.

11. The method of any of the above statements, wherein if the node contains data above the threshold value a first logical value is assigned, and if the node contains data below the threshold value a second logical value is assigned.

12. The method of any of the above statements, further comprising the step of, for each of a plurality of tiles, determining metadata regarding the length of data, required to encode the tile of data and the data structure as a streamlength.

13. The method of statement 12 further comprising the steps of:

grouping a plurality of tiles together to define a plurality of encoding units for the frame of data;

for each of the encoding units mapping the streamlengths for each of the each of the tiles which forms said encoding unit as second data structure, wherein the mapping of the second data structure comprises the steps of:

subdividing each encoding unit into a plurality of encoding unit data sets;

defining for each of the plurality of encoding unit data sets a corresponding encoding unit node;

assigning a value to each encoding unit node, said value indicating whether the data sets corresponding to said node contains data above, equal or below, a threshold value; and mapping the assigned values as generated as a first level of the second data structure.

14. The method of statement 13 wherein the method comprises mapping the second data structure in a sparsified manner.

15. The method of statement 13 or 14 wherein the node comprises four encoding unit data sets.

16. The method of statement 14 or 15 wherein the mapping the second data structure is as a sparsified quadtree.

17. The method of any of statements 13 to 16 wherein the method further comprises defining further levels of sparsified quadtree by:

grouping a plurality of encoding unit nodes to define a plurality of encoding unit parent nodes;

for each of the encoding unit parent nodes determining whether any of the encoding unit nodes defining said encoding unit parent node contains a data above the threshold value;

assigning a value to each of the encoding unit parent node, the value indicating whether said encoding unit parent node contains any data above, equal or below, the threshold value; and defining the further level of the sparsified quadtree based on the assigned values.

18. The method of any of statements 13 to 17 when dependent on statement 7 further comprising the step of encoding the streamlengths of the data and the second data structure.

19. The method of any preceding statement wherein the first frame of data comprises metadata is indicative of an attribute describing a property of the data of the node.

20. The method of statement 19 wherein the property is a statistical attribute of the node.

21. The method of statement 20 wherein the statistical attribute is one or more of: luma, chroma, and number of bits required to encode one or more pixels.

22. The method of any preceding statement wherein the tiles and nodes are of a fixed size.

23. The method of any preceding statement comprising encoding the frame of video data at a plurality of levels of quality of the video data.

24. An encoder for encoding a stream of video data comprising a plurality of frames of video data, the encoder configured to, for a first frame of data, perform the steps of: any of method statements 1 to 23.

25. A method of decoding a stream of encoded data the method comprising, at a decoder:

receiving an encoded dataset comprising multiple tiles;

receiving a data structure, said data structure indicative of the amount of data required to encode a plurality of tiles;

identifying a portion of the encoded dataset to be decoded by:

identifying the tiles associated with the portion to be decoded;

determining the location of data related to the tiles based on the amount of data required to encode said tiles;

extracting the identified portion of the encoded dataset from the encoded dataset; and decoding said identified portion of the encoded data set.

26. The method of statement 25, wherein the dataset is organized in tiers, with a first tier further comprising:

information indicative of the distribution of the data within the dataset.

27. The method of statement 25 or 26 wherein the first tier of the dataset comprises residual data.

28. The method of any of statements 26 or 27 further comprising a second tier further comprising information relating to the amount of data required to encode a plurality of tiles.

29. The method of statement 28 further comprising the step of determining the location of the data for a tile to be decoded within the encoded stream based on the information in the second tier.
30. The method of statement 29 wherein the tiles are decoded sequentially.
31. The method of statement 30 wherein the tiles are decoded in a z-order sequence.
32. The method of statements 30 or 31 comprising the steps of determining the location of the data for a tile in the encoded stream based on a summation of the amount of data required to encode any preceding tile.
33. The method of statement 32 further comprising decoding the encoded data stream at the determined location of the data for the tile.
34. The method of statement 33 further comprising the steps of:
   obtaining information regarding an area, comprising a plurality of tiles, of the frame of data to be selectively decoded;
   determining the location the data in the stream of encoded data relating to said area based on the determined streamlengths for all of the tiles;
   selectively decoding the data in the stream of encoded data as identified as relating to the selected area based on the determined streamlength.
35. The method of any of statements 25 to 34 wherein the received stream of encoded video data is encoded at a plurality of levels of quantisation.
36. The method of statement 35 wherein the method comprises decoding the stream of encoded video data at a first level of quantisation.
37. The method of statement 35, further comprising the steps of decoding a first tile or area at a first level of quantisation.
38. The method of statement 37 further comprising the step of decoding a second tile, or area, at a second, different, level of quantisation.
39. The method of any statements 25 to 38 further comprising identifying a second portion of the encoded data stream to be decoded, and decoding said second portion.
40. The method of statement 39 wherein the first portion is decoded by a first decoder and the second portion is decoded by a second, different decoder.
41. The method of any of statements 25 to 41 wherein the encoded stream is a stream of one of video data, image data.
42. A decoder for decoding an encoded stream of video data the decoder configured to execute the method of any of statements 25 to 41.
43. A method of decoding a stream of encoded data, the method comprising, at a decoder:
   receiving an encoded dataset comprising a plurality of tiles;
   receiving a data structure, said data structure indicative of the distribution of data above, below or equal to, a threshold value for the plurality of tiles;
   identifying the tiles to be decoded in the data structure which have data above, or equal to, the threshold value decoding the identified tiles.
44. The method of statement 43, wherein the dataset is organized in tiers, with a first tier further comprising the data structure indicative of the distribution of the data within the dataset, and a second tier comprising information relating to the amount of data required to encode a plurality of tiles.
45. The method of statement 43 or 44 wherein encoded stream is a stream of one of video data, image data.
46. The method of statement 44 or 45 further comprising the step of determining the location of the data for a tile to be decoded within the encoded stream based on the information in the second tier.
47. The method of statement 46 wherein the tiles are decoded sequentially.
48. The method of statement 47 wherein the tiles are decoded in a z-order sequence.
49. The method of statements 47 or 48 comprising the steps of determining the location of the data for a tile in the encoded stream based on a summation of the amount of data required to encode any preceding tile.
50. The method of statement 49 further comprising decoding the encoded data stream at the determined location of the data for the tile.
51. The method of any of statement 50 further comprising the steps of:
   obtaining information regarding an area, comprising a plurality of tiles, of the frame of data to be selectively decoded;
   determining the location the data in the stream of encoded data relating to said area based on the determined streamlengths for all of the tiles;
   selectively decoding the data in the stream of encoded data as identified as relating to the selected area based on the determined streamlength.
52. The method of any of statements 43 to 51 wherein the received stream of encoded video data is encoded at a plurality of levels of quantisation.
53. The method of statement 52 wherein the method comprises decoding the stream of encoded video data at a first level of quantisation.
54. The method of statement 53, further comprising the steps of decoding a first tile or area at a first level of quantisation.
55. The method of statement 54 further comprising the step of decoding a second tile, or area, at a second, different, level of quantisation.
56. The method of any of statements 43 to 55 further comprising identifying a second portion of the encoded data stream to be decoded, and decoding said second portion.
57. The method of statement 56 wherein the first portion is decoded by a first decoder and the second portion is decoded by a second, different decoder.
58. A decoder for decoding an encoded stream of video data the decoder configured to execute the method of any of statements 43 to 57.
59. A method of decoding a stream of encoded data, the method comprising:
   receiving an encoded dataset comprising a plurality of tiles;
   receiving a data structure, said data structure indicative of the amount of data required to encode each of the plurality of tiles;
   identifying a plurality of portions of the encoded dataset to be decoded by:
      identifying the tiles associated with each portion to be decoded;
      for each portion determining the location of data related to the tiles for said portion based on the amount of data required to encode said tiles associated with said portion;
      for each said identified portion, extracting said portion from the encoded dataset; and
   decoding said a first portion of the encoded data set with a first decoder, and decoding a second portion of the encoded data set with a second, different, decoder.

60. The method of statement 59, wherein the dataset is organized in tiers, with a first tier further comprising the data structure indicative of the distribution of the data within the dataset.

61. The method of statement 60 wherein the dataset further comprises a second tier comprising information relating to the amount of data required to encode a plurality of tiles.

62. The method of any of statements 59 to 61 wherein encoded stream is a stream of one of video data, image data.

63. The method of statement 61 or 62 further comprising the step of determining the location of the data for a tile to be decoded within the encoded stream based on the information in the second tier.

64. The method of statement 63 wherein the tiles are decoded sequentially.

65. The method of statement 64 wherein the tiles are decoded in a z-order sequence.

66. The method of any of statements 63 to 65 comprising the steps of determining the location of the data for a tile in the encoded stream based on a summation of the amount of data required to encode any preceding tile.

67. The method of statement 66 further comprising decoding the encoded data stream at the determined location of the data for the tile.

68. The method of statement 67 further comprising the steps of:
   obtaining information regarding an area, comprising a plurality of tiles, of the frame of data to be selectively decoded;
   determining the location the data in the stream of encoded data relating to said area based on the determined streamlengths for all of the tiles;
   selectively decoding the data in the stream of encoded data as identified as relating to the selected area based on the determined streamlength.

69. The method of any of statements 59 to 68 wherein the received stream of encoded video data is encoded at a plurality of levels of quantisation.

70. The method of statement 69 wherein the method comprises decoding the stream of encoded video data at a first level of quantisation.

71. A decoder for decoding an encoded stream of video data the decoder configured to execute the method of any of statements 59 to 70.

72. A hierarchical data structure for encoding an image, the data structure including a plurality of levels of quality, each level of quality comprising a plurality of tiers, each tiers comprising one or more data elements.

73. A data structure as in statement 72, wherein:
   each level of quality defines a respective set of encoded data which, when decoded, enable a decoder to reconstruct the image up to a desired level of quality;
   each tier comprises one or more data elements, said data elements being defined depending on the type of tier, and wherein:
   for a tier of a first type, a first type of data element is defined comprising a subset of the set of encoded data; and
   for a tier of a second type, a second type of data element is defined comprising one or more attributes associated with the first type of data element.

74. A data structure as in statement 72 or 73, wherein the data elements comprises a plurality of layers, and wherein:
   a first layer comprises a plurality of values;
   one or more layers comprise data indicating where, in the first layer, non-zero values are present.

75. The data structure as in statement 74, wherein for the first type of data elements, the values are associated with encoded residual values.

76. The data structure as in statement 74, wherein for the first type of data elements, the values are associated with encoded transformed residual values.

77. The data structure as in any of statement 74 to 76, wherein for the second type of data elements, the values are associated with metadata indicating one or more attributes of the first type of data element.

78. The data structure as in statement 77, wherein the metadata indicate the size of a corresponding the first type of data element.

79. The data structure as in statement 78, wherein the metadata indicate a statistical distribution associated with the values of a corresponding first type of data element.

80. A computer readable medium comprising instructions which when executed by a processor causes the processor to execute the steps of any of the preceding method statements.

The invention claimed is:

1. A method of decoding a stream of encoded data that has been selectively encoded in a manner such that some, but not all, values of a residual frame are encoded while other values of the residual frame are not encoded, the method comprising, at a decoder:
   receiving an encoded dataset comprising multiple tiles, wherein the decoder is configured to decode sparse residual data included in the encoded dataset, and wherein the sparse residual data is generated by:
      subdividing a residual frame of data into a plurality of tiles;
      identifying, from among the plurality of tiles, a first block of residual data, a second block of residual data, and a third block of residual data, the first and second blocks having associated values above a threshold while the third block has an associated value equal to or below the threshold; and
      selecting tiles comprising the first and second blocks to be encoded and to be included among said multiple tiles while refraining from encoding a tile comprising the third block such that a sparse encoding process is performed in which some, but not all, tiles in the plurality of tiles are encoded and such that the encoded dataset includes residual frame tiles whose values were encoded and does not include residual frame tiles whose values were not encoded;
   receiving a data structure, said data structure indicative of an amount of data required to encode the tiles comprising the first and second blocks;
   identifying a portion of the encoded dataset to be decoded, wherein said portion includes the tiles comprising the first and second blocks but does not include the tile comprising the third block, and wherein said identifying is performed by determining a location of data related to the tiles comprising the first and second blocks based on the amount of data required to encode the tiles comprising the first and second blocks;
   extracting the identified portion of the encoded dataset from the encoded dataset; and
   causing the identified portion, which includes the tiles comprising the first and second blocks, to be decoded such that the decoder decodes the first block and the second block and such that the decoder refrains from decoding the third block.

2. The method of claim 1, wherein the encoded dataset is organized into tiers, with a first tier further comprising:

information indicative of a distribution of tile data included within the dataset.

3. The method of claim 2, wherein the sparse residual data is generated by computing a difference between (i) a frame after that frame has been down sampled once and (ii) the frame after that frame has been down sampled twice and then subsequently up-sampled.

4. The method of claim 2, wherein the tiers further comprise a second tier, the second tier further comprising information relating to the amount of the data required to encode the tiles comprising the first and second blocks.

5. The method of claim 4 further comprising determining a particular location of particular data for a particular tile to be decoded within the encoded dataset based on the information in the second tier.

6. The method of claim 5, wherein the encoded dataset was encoded sequentially, and wherein the method further comprises determining the particular location of the particular data for the particular tile in the encoded dataset based on a summation of a particular amount of data required to encode any preceding tile.

7. The method of claim 6 further comprising decoding the encoded dataset at the determined particular location of the particular data for the particular tile.

8. The method of claim 1 further comprising identifying a second portion of the encoded dataset to be decoded, and decoding said second portion wherein the first portion is decoded by a first decoder and the second portion is decoded by a second, different decoder.

9. A method of decoding a stream of encoded data that has been selectively encoded in a manner such that some, but not all, values of a residual frame are encoded while other values of the residual frame are not encoded, the method comprising, at a decoder:
    receiving an encoded dataset comprising multiple tiles, wherein the decoder is configured to decode sparse residual data included in the encoded dataset, and wherein the sparse residual data is generated by:
        subdividing a residual frame of data into a plurality of tiles;
        identifying, from among the plurality of tiles, a first block of residual data, a second block of residual data, and a third block of residual data, the first and second blocks having associated values above a threshold while the third block has an associated value equal to or below the threshold; and
        selecting tiles comprising the first and second blocks to be encoded and to be included among said multiple tiles while refraining from encoding a tile comprising the third block such that a sparse encoding process is performed in which some, but not all, tiles in the plurality of tiles are encoded and such that the encoded dataset includes residual frame tiles whose values were encoded and does not include residual frame tiles whose values were not encoded;
    receiving a data structure, said data structure indicative of a distribution of data above, below, or equal to, the threshold for the multiple tiles;
    identifying the tiles comprising the first and second blocks, wherein the tiles comprising the first and second blocks have the associated values that are above, or equal to, the threshold, and wherein the tiles comprising the first and second blocks are encoded at a first level of quality and at a second level of quality, the second level of quality being a higher level of quality than the first level of quality; and
    causing the tiles comprising the first and second blocks to be decoded such that the decoder decodes the first block and the second block and such that the decoder refrains from decoding the third block.

10. The method of claim 9, wherein the encoded dataset is organized in tiers, with a first tier further comprising the data structure, which is indicative of the distribution of the data within the dataset, and a second tier comprising information relating to an amount of data required to encode the multiple tiles.

11. The method of claim 10 further comprising determining a location of particular data for a particular tile to be decoded within the encoded dataset based on the information in the second tier.

12. The method of claim 11, wherein the multiple tiles are encoded sequentially, and wherein the method further comprises determining the location of the particular data for the particular tile in the encoded dataset based on a summation of a particular amount of data required to encode any preceding tile.

13. The method of claim 12 further comprising decoding the encoded dataset at the determined location of the particular data for the particular tile.

14. The method of claim 9, wherein the received encoded dataset is encoded at a plurality of levels of quantisation, wherein the method comprises decoding a first tile of the encoded dataset at a first level of quantisation, and decoding a second tile, or area, at a second, different, level of quantisation.

15. A decoder for decoding an encoded stream of video data, where the encoded stream is selectively encoded in a manner such that some, but not all, values of a residual frame are encoded while other values of the residual frame are not encoded, the decoder configured to execute a method comprising:
    receiving an encoded dataset comprising multiple tiles wherein the decoder is configured to decode sparse residual data included in the encoded dataset, and wherein the sparse residual data is generated by:
        subdividing a residual frame of data into a plurality of tiles;
        identifying, from among the plurality of tiles, a first block of residual data, a second block of residual data, and a third block of residual data, the first and second blocks having mapped binary values of 1 as a result of the first and second blocks including non-zero residual values while the third block has a mapped binary value of 0 as a result of the third block including a zero residual value; and
        selecting tiles comprising the first and second blocks to be encoded and to be included among said multiple tiles while refraining from encoding a tile comprising the third block such that a sparse encoding process is performed in which some, but not all, tiles in the plurality of tiles are encoded and such that the encoded dataset includes residual frame tiles whose values were encoded and does not include residual frame tiles whose values were not encoded;
    receiving a data structure, said data structure indicative of an amount of data required to encode the tiles comprising the first and second blocks;
    identifying a portion of the encoded dataset to be decoded by, wherein said portion includes the tiles comprising the first and second blocks but does not include the tile comprising the third block, and wherein said identifying is performed by determining a location of data related to the tiles comprising the first and second blocks based on the amount of data required to encode the tiles comprising the first and second blocks, extracting the identified portion of the encoded dataset from the encoded dataset; and causing the identified portion, which includes the tiles comprising the first and second blocks, to be decoded such that the decoder decodes the first block and the second block and such that the decoder refrains from decoding the third block.

16. The method of claim 1, wherein the method further includes:

after decoding the identified portion of the encoded dataset, reconstructing an image using the decoded identified portion of the encoded dataset.

17. The method of claim 9, wherein the method further includes:

after decoding the identified set of tile, reconstructing an image using the decoded identified set of tiles.

18. The method of claim 15, wherein the method further includes:

after decoding the identified portion of the encoded dataset, reconstructing an image using the decoded identified portion of the encoded dataset.

19. The method of claim 1, wherein:

residual values of the first and second blocks are non-zero residual values, a binary map maps the non-zero residual values to a value of 1, a residual value of the third block is a zero residual value, the binary map maps the zero residual value to a value of 0, and the threshold is set a value of 0.

20. The method of claim 1, wherein the data structure is structured such that reliance on a preceding layer having a different level of quality is avoided when decoding the encoded dataset such that the encoded dataset is decoded without reference to any other layer.

* * * * *